US011551567B2

(12) United States Patent
Arvindam

(10) Patent No.: US 11,551,567 B2
(45) Date of Patent: Jan. 10, 2023

(54) SYSTEM AND METHOD FOR PROVIDING AN INTERACTIVE VISUAL LEARNING ENVIRONMENT FOR CREATION, PRESENTATION, SHARING, ORGANIZING AND ANALYSIS OF KNOWLEDGE ON SUBJECT MATTER

(71) Applicant: IDEAPHORA INDIA PRIVATE LIMITED, Bengaluru (IN)

(72) Inventor: Anil Arvindam, Bengaluru (IN)

(73) Assignee: IDEAPHORA INDIA PRIVATE LIMITED, Karnataka (IN)

( * ) Notice: Subject to any disclaimer, the term of this patent is extended or adjusted under 35 U.S.C. 154(b) by 0 days.

(21) Appl. No.: 17/098,352

(22) Filed: Nov. 14, 2020

(65) Prior Publication Data

US 2021/0065569 A1 Mar. 4, 2021

Related U.S. Application Data

(63) Continuation-in-part of application No. 14/835,009, filed on Aug. 25, 2015, now abandoned.

(30) Foreign Application Priority Data

Aug. 28, 2014 (IN) ............................ 4200/CHE/2014

(51) Int. Cl.
*G09B 5/06* (2006.01)
*G06F 40/253* (2020.01)
(Continued)

(52) U.S. Cl.
CPC ............. *G09B 5/06* (2013.01); *G06F 3/0486* (2013.01); *G06F 40/117* (2020.01);
(Continued)

(58) Field of Classification Search
None
See application file for complete search history.

(56) References Cited

U.S. PATENT DOCUMENTS 6,076,088 A * 6/2000 Paik .................. G06F 17/30707
2004/0202987 A1* 10/2004 Scheuring ................ G09B 7/02
434/118

(Continued)

*Primary Examiner* — Nathan Hillery
(74) *Attorney, Agent, or Firm* — Barry Choobin; Patent 360 LLC

(57) ABSTRACT

The embodiments herein disclose a system and a method for providing an online web-based interactive audio-visual platform for note creation, presentation, sharing, organizing, and analysis. The system provides a conceptual and interactive interface to content; analyses a student's notes and instantly determines the accuracy of the conceptual connections made and a student's understanding of a topic. The system enables the student to add and use audio, visual, drawing, text notes, and mathematical equations in addition to those suggested by the note taking solution; to collate notes from various sources in a meaningful manner by grouping concepts using colors, images, and text; and to personalize other maps developed within the same environment while maintaining links back to the original source from which the notes are derived. The system highlights keywords in conjunction with spoken text to complement the advantages of using visual maps to improve learning outcomes.

15 Claims, 20 Drawing Sheets

US 11,551,567 B2
Page 2

(51) Int. Cl.
  *G06F 40/205* (2020.01)
  *G06F 40/30* (2020.01)
  *G06F 40/289* (2020.01)
  *G06F 3/0486* (2013.01)
  *G06F 40/117* (2020.01)
  *G06V 10/40* (2022.01)
  *G06V 30/10* (2022.01)

(52) U.S. Cl.
  CPC .......... *G06F 40/205* (2020.01); *G06F 40/253* (2020.01); *G06F 40/289* (2020.01); *G06F 40/30* (2020.01); *G06V 10/40* (2022.01); *G06V 30/10* (2022.01)

(56) References Cited

U.S. PATENT DOCUMENTS

| | | | |
|---|---|---|---|
| 2005/0251383 A1* | 11/2005 | Murray | G06F 17/2785 704/9 |
| 2006/0223040 A1* | 10/2006 | Brown | G09B 5/00 434/298 |
| 2008/0046450 A1* | 2/2008 | Marshall | G06F 17/30734 |
| 2008/0104032 A1* | 5/2008 | Sarkar | G06F 17/3089 |
| 2008/0208885 A1* | 8/2008 | Barber | G06F 17/2247 |
| 2008/0232690 A1* | 9/2008 | Saund | G06F 3/04883 382/187 |
| 2008/0235211 A1* | 9/2008 | Saund | G06F 17/3053 |
| 2009/0049067 A1* | 2/2009 | Murray | G06F 17/2785 |
| 2010/0114879 A1* | 5/2010 | Zhong | G06F 17/278 707/723 |
| 2010/0223223 A1* | 9/2010 | Sandler | G06F 17/30743 706/50 |
| 2011/0099139 A1* | 4/2011 | Coldicott | G06Q 10/06 706/47 |
| 2011/0153610 A1* | 6/2011 | Carrato | G06F 17/3089 707/738 |
| 2012/0303629 A1* | 11/2012 | Klein | G06F 9/453 707/741 |
| 2012/0317108 A1* | 12/2012 | Okazaki | G06F 3/0488 707/732 |
| 2012/0324347 A1* | 12/2012 | Monroe | G06F 17/2785 715/255 |
| 2013/0013650 A1* | 1/2013 | Shum | G06F 17/30525 707/805 |
| 2013/0086061 A1* | 4/2013 | Lane | G06F 17/3089 707/736 |
| 2013/0238649 A1* | 9/2013 | Shum | G06F 17/30292 707/758 |
| 2014/0019385 A1* | 1/2014 | Dawson | G06F 17/2705 706/10 |
| 2014/0255898 A1* | 9/2014 | Burge | G09B 5/08 434/350 |
| 2014/0342342 A1* | 11/2014 | Drummond | G09B 7/06 434/362 |
| 2014/0344213 A1* | 11/2014 | Kent | G06Q 50/01 707/608 |
| 2015/0081689 A1* | 3/2015 | Marshall | G06F 17/30734 707/725 |
| 2016/0210298 A1* | 7/2016 | Thompson, III | G06F 17/3087 |
| 2017/0308792 A1* | 10/2017 | Liang | G06F 17/30 |
| 2018/0060733 A1* | 3/2018 | Beller | G06N 5/02 |
| 2018/0196798 A1* | 7/2018 | Yadati | G06F 17/2785 |
| 2018/0307694 A1* | 10/2018 | Minoda | G06F 17/3064 |
| 2018/0366013 A1* | 12/2018 | Arvindam | G06F 40/205 |

* cited by examiner

SYSTEM AND METHOD FOR PROVIDING AN INTERACTIVE VISUAL LEARNING ENVIRONMENT FOR CREATION, PRESENTATION, SHARING, ORGANIZING AND ANALYSIS OF KNOWLEDGE ON SUBJECT MATTER

CROSS-REFERENCE TO RELATED APPLICATIONS

This application is a Continuation-In-Part (CIP) of the Non-Provisional application (NPA) with Ser. No. 14/835,009 filed at USPTO on Aug. 25, 2015, with the title. "SYSTEM AND METHOD FOR PROVIDING AN INTERACTIVE VISUAL LEARNING ENVIRONMENT FOR CREATION. PRESENTATION. SHARING, ORGANIZING AND ANALYZING OF KNOWLEDGE ON SUBJECT MATTER", and the contents of which is included entirely as reference herein. The embodiments herein claim the priority and benefit of an Indian Provisional Patent Application with serial number 4200/CHE/2014 filed on Aug. 28, 2014 and entitled, "SYSTEM AND METHOD FOR PROVIDING INTERACTIVE AUDIO-VISUAL PLATFORM FOR NOTE CREATION, PRESENTATION AND ASSESSMENT" and the Non-Provisional application (NPA) with Ser. No. 14/835,009) filed at USPTO on Aug. 25, 2015, with the title, "SYSTEM AND METHOD FOR PROVIDING AN INTERACTIVE VISUAL LEARNING ENVIRONMENT FOR CREATION, PRESENTATION, SHARING, ORGANIZING AND ANALYZING OF KNOWLEDGE ON SUBJECT MATTER", and the contents of which are included in entirety herein at least by reference.

BACKGROUND

Technical Field

The embodiments herein is generally related to a system and a method for providing a visual and interactive representation of knowledge. The embodiments herein is more particularly related to a system and a method to use a plurality of online sources to create, present, organize, analyze, organize and share knowledge on a subject matter in the form of interactive audio-visual notes in a single web based or tablet based solution to enhance learning and improve learning outcomes.

Description of the Related Art

The representation of knowledge in the form of visual maps is primarily based on a work pioneered by Tony Buzan (mind maps) and Joseph Novak (concept maps) respectively. A mind map is a diagram used to visually organize information. A mind map is created around a single concept drawn as an image in the center of a blank page. The color coded branches are added to the central image with each branch associated with a keyword. The images are often added to visualize a keyword or concept. A concept map is a diagram that depicts the suggested relationships between the concepts. The concepts, enclosed in circles or other shapes, are connected to other concepts by lines. These lines contain phrases that specify the relationship between the concepts.

The mind maps and concept maps are used in education and business for note-taking, brainstorming, summarizing and collaboration. Research has shown that the consistent use of visual maps for note taking improves memory, learning and creativity. This is mainly due to the utilization of the entire range of cortical skills on both sides of the brain for creating and organizing the visual maps using color, images and text. Further, the visual mapping process improves the short term recall by 30% and long term recall by 10% in comparison to the linear forms of note-taking.

The fundamental premise in visual mapping is to write notes or key phrases visually and spatially by linking or associating each note or key-phrase with other notes or key-phrases through implicit or explicit connections. The map is a representation of a thought process that uses color, image and text cues to anchor the key concepts and their associations in memory. There are several companies offering various tools to create the visual maps in the form of mind maps or concept maps. Even though there are literally hundreds of online solutions to choose from, the use of this form of note taking is limited.

Primarily, this is because the schools do not actually teach the children how to learn using the visual note taking technique or other techniques. The visual note taking needs to be taught and used consistently for it to be a natural part of the learning process. Even though visual note-taking is an effective alternative technique to the existing methods of learning, it is not taught in schools.

The software solutions available today do not make it easy for the teachers and the students to create notes quickly and easily, when trying to map an online material. The teachers have to manually add the keywords and the images and it generally takes a long time to create a map. The notes and the online material are not linked together so the user has to switch between the note taking software and the online material which is usually displayed using another software application. Switching back and forth between the notes and the sources detracts the user from the learning process.

Many online learners use multiple resources to learn online. These resources include online videos, HTML pages, PDF documents and material in other formats. This typically requires multiple viewers for each form of content and the user switches between these to accumulate the notes and a background information. However, once the notes are completely prepared and the user starts reviewing them prior to a test or exam, it becomes difficult to determine the source of a particular note. Going back to the source for a more detailed review when necessary—for instance, when a concept is unclear—is problematic.

The online learner juggles the resources of various formats and their associated viewers such as a MP4 player for video, a PDF reader for PDF documents and a browser for HTML pages, while searching for and consuming a content. In the ideal scenario, the format of the content has no bearing on the knowledge that it contains There are no systems available today to allow the learners to search for, create, and share knowledge that is intrinsic to the resources and to topics to which the resources belong.

The Ontologies and the datasets used to analyze and reuse a domain knowledge for K-12 and the higher education subjects are limited and typically expert-driven. There is a large gap that exists in K-12 ontologies that needs to be filled.

An assessment of a student's grasp of knowledge is determined by the quizzes of varying flavors. There are almost no solutions to determine whether the student is making the correct conceptual connections while be is learning.

The children with special needs usually require the specially crafted applications for an online learning. There are very few solutions available today and are designed to work for all kinds of learners including those with special needs.

The above mentioned shortcomings, disadvantages and problems are addressed herein and will be understood by reading and studying the following specification.

OBJECT OF THE EMBODIMENTS HEREIN

The primary object of the embodiments herein is to provide a system and method to use a plurality of online sources to create, present, organize, share and analyze knowledge on a subject matter in the form of interactive audio-visual notes, or knowledge maps in a single web or tablet based platform.

Another object of the embodiments herein is to provide an effective note-taking strategy based on a semantic analysis of an educational material and visual mapping to make it effortless for the users to create, share, find and personalize their knowledge maps.

Yet another object of the embodiments herein is to provide a system and method for the user to construct the knowledge maps faster than existing solutions by providing the key text and image suggestions extracted from the source and related material.

Yet another object of the embodiments herein is to provide the user with an access to the original source without leaving the note taking platform thereby providing a seamless, conceptual and interactive interface to the content.

Yet another object of the embodiments herein is to personalize a teacher's or a user's notes and still retain an indirect access to the source from which the notes were derived.

Yet another object of the embodiments herein is to allow the teachers to assess a student's understanding of a topic by automatically evaluating the notes prepared by the student and comparing the same with the expected results.

Yet another object of the embodiments herein is to collect all interaction between the user and the Visual Learning Environment to determine the nature and type of a user and the efficacy of the user interface.

Yet another object of the embodiments herein is to enable the users to collate the notes from several sources in a single conceptual and interactive platform to focus on the construction of knowledge without being distracted by the format and nature of the resources being used to construct such knowledge.

Yet another object of the embodiments herein is to provide a visual summary of a material to the users to quickly decide a relevance to the topic they are working on.

Yet another object of the embodiments herein is to create datasets or ontologies using a plurality of user sourced knowledge maps aided by a combination of automatic generation of knowledge maps and domain-expert inputs.

Yet another object of the embodiments herein is to provide a platform for the teachers to use a spatio-temporal presentation of a topic using the interactive maps which can be personalized by the student.

Yet another object of the embodiments herein is to provide a platform that works with equal effectiveness for all types of learners including those with special needs.

These and other objects and advantages of the embodiments herein will become readily apparent from the following detailed description taken in conjunction with the accompanying drawings.

SUMMARY

The various embodiments herein provide a system and a method for creating, presenting, sharing and analyzing knowledge on a subject matter acquired from a plurality of online sources and a plurality of users and domain experts in a single web or tablet based platform. The system integrates and makes available a plurality of information extracted from a plurality of source materials on the web or tablet based platform. The system further provides an interface for the users to construct knowledge from the plurality of information in the form of audio-visual notes or knowledge maps. The user is allowed to seamlessly switch between the notes and the source material. The system further provides a conceptual and interactive interface to the content. The system analyses a student's knowledge map and determines the accuracy of the conceptual connections being made and his/her understanding of a topic. The system further provides an instant feedback on the accuracy of the conceptual connections made within the knowledge maps. The system enables the student to add and use audio notes, visual notes, text notes and mathematical equations in addition to those that are automatically suggested by the Visual Learning Environment. The system allows the user to collate the notes from the various sources in a meaningful manner by grouping the concepts using the colors, images, and text. The system further enables the user to personalize the publicly available knowledge maps developed within the same environment so that complete notes or note snippets from a particular map can be imported, edited, and customized while maintaining the links back to the original source from which the imported notes are derived. The system provides the additional anchors or cues to help improve memory and learning by complementing the proven advantages of using the visual maps as a note taking strategy. The system highlights the keywords in conjunction with a spoken text in audio/video material and highlights the keywords in-situ in a text based material.

According to an embodiment herein, a computer implemented method is provided for creating, presenting, sharing, organizing and analyzing knowledge on a subject matter. The method comprises instructions stored on a non-transitory storage medium and run on a computing device to execute the following steps. A plurality of resources or documents related to a particular topic is collected from a user or content provider. A key information related to the particular topic from the plurality of resources or documents is extracted using a Resource Ingestion and Pre-processing module. A raw text, a plurality of words tagged with position information and a plurality of images in the resource or document are extracted along with a metadata about the plurality of resources.

A resource or document is parsed to extract and tag all the words in the resource or document using a parsing module. The extracted words are tagged with a position information and a formatting information. The words extracted by the parsing module are classified and tagged into parts of speech using a Part-of-Speech (POS) tagging module based on a combination of rule based algorithm and a stochastic based algorithm.

A knowledge map is automatically generated using the Knowledge engine. A plurality of user generated knowledge maps is created with the extracted words and images using a visual learning interface and data presentation module. The plurality of user generated knowledge maps is collected. The plurality of knowledge maps is audio-visual knowledge map. The plurality of knowledge maps comprises a text, an image, a mathematical equation, a drawing, an audio and a video notes/nodes. A plurality of knowledge maps is created by experts on a subject matter and received by the visual learning interface and data presentation module. The automatically generated knowledge map is combined with the plurality of knowledge maps created by the users and the plurality of knowledge maps created by the experts on the subject matter to create a gold standard map for a topic on the subject matter by using the visual learning interface and data presentation module. An understanding of the user in a subject matter is assessed by comparing the knowledge map created by the user with the knowledge map created by the teacher or an expert or an automatically generated gold standard map by the visual learning interface and data presentation module.

According to an embodiment herein, the step of collecting the plurality of resources or documents related to the particular topic from the user or content provider and extracting the relevant information comprises acquiring the plurality of resources or documents and placing the acquired documents in a document corpora. The document corpora is categorized by a subject, a topic and a unit. A pre-processing operation is performed on the collected resources or documents to determine a type or format of the collected resources or documents. The pre-processing operation includes a text processing operation, an audio processing operation and a video processing operation. A preset information related to the resource or document is extracted. The preset information includes topic, file type, file size, author, owner, date created and date modified.

According to an embodiment herein, the step of parsing a resource or document to extract and tag all the words in the resource or document using a parsing module comprises extracting and tagging all the words in the resource or document except commonly used words. The commonly used words include articles, prepositions, conjunctions and interjections. The words are tagged with a position information. The position information includes a paragraph number, a line number, a column number and a row number for text. The position information includes an actual time offset in minutes or seconds for a video or audio. The words are tagged with a formatting information. The formatting information includes a font size, a font type, a font style, a section header and a numbered list. A document formatting weights is assigned for each word in the document based on the formatting information using a plurality of typographical analysis methods. An intra-document semantic weight of the key-phrase or word in the document is calculated using a plurality of intra-document semantic analysis methods. An inter-document semantic weight of the key-phrase or word is calculated based on the corpus acquired by analyzing the document corpus. The inter-document semantic weight and the intra-document semantic weight are combined to create an aggregate semantic weight of the key-phrase or word in the document. The aggregate semantic weight of the key-phrase or word is updated based on the document formatting weights determined by the typographical analysis. The updated aggregate semantic weight for the words in the acquired or collected documents is collected and saved in a database.

According to an embodiment herein, the step of classifying and tagging the words into the parts of speech using the Part-of-Speech (POS) tagging module comprises executing a plurality of training and analyzing algorithms to classify the words extracted by the parsing module with the parts of speech. The classification of the word is done based on a definition of the word and a context of the word in a phrase, a sentence, or a paragraph. The words are tagged with Part of Speech (POS) tags and the POS tags includes nouns, verbs and adverbs.

According to an embodiment herein, the step of creating the plurality of knowledge maps with the extracted words and the images using the visual learning interface and data presentation module comprises presenting the key-phrases, the words and the images extracted from the resource to the user in synchronization with a presentation of the resource. The extracted key-phrases are dragged and dropped onto the knowledge map with a user device to create a node on the knowledge map. A plurality of nodes is created on the knowledge map by adding the image notes, adding the text nodes, the drawing nodes and the mathematical equation nodes manually onto the map. A text on the node is edited based on a user requirement or need. Only the text is modified while a tagged data associated with the node is retained. The pluralities of the nodes are connected to each other using the linking phrases. A relation is established between the two nodes. The key-phrase node is selected to retrieve the source/original document from which the key-phrase is extracted and the extracted key-phrase position in the source/original document is also retrieved. The nodes are converted from speech to text and played back during a review mode. An audio node is created instead of an image/text node and played back when the node is selected. A video node is created so that an external video is played when the node is selected. The constructed knowledge map is edited using the editing tools to change the shapes, the colors and the link types. The constructed knowledge map is saved and retrieved at any time.

According to an embodiment herein, the method further comprises analyzing a plurality of conceptual connections in the knowledge map. The step of analyzing the plurality of conceptual connections in the knowledge map comprises acquiring a map data of the user knowledge map. The map data comprises a plurality of concepts and a plurality of links between the pluralities of concepts. A knowledge map is generated automatically from the corpus of resources and the existing maps for a topic. A teacher is allowed to create a knowledge map. The teacher created knowledge map is used for an assessment of the user knowledge map. The teacher created knowledge map is used as a base map by the user for personalizing the knowledge map. A semantic closeness of knowledge map created by the user to the teacher created knowledge map and/or the knowledge map generated from the corpus is estimated by using the template-based methods and statistical methods. A plurality of areas in the knowledge map created by the plurality of users is extracted and stored to identify a portion that is difficult to comprehend or requires additional background information to help comprehend the material. The extracted information is forwarded to the teacher for use in the follow-up classes or to redesign, re-purpose, or re-present a study material to the class. The user is guided through a process of creating a knowledge map until the user completely grasps and constructs an accurate knowledge map of the topic. The conceptual connections made by the user are analyzed to evaluate a conceptual understanding of a topic with respect to the expected semantic meaning of a connection. The conceptual connections enable a teacher to evaluate a user's learning process while the user is in a process of taking notes and before conducting a formal assessment.

According to an embodiment herein, the method further comprises highlighting the key-phrases in the knowledge maps in conjunction with audio by the visual learning interface or data presentation module to anchor the concepts in a user memory to help recall and learning.

According to an embodiment herein, the method further comprises generating an ontology/dataset for a specified category with an ontology/dataset processing module and mapping a data on a newly received resource to the already created ontology/dataset.

According to an embodiment herein, the method further comprises a platform to create the interactive audio-visual knowledge maps for learning for children with special needs.

According to an embodiment herein, a system is provided for creating, presenting, sharing and analyzing knowledge on a subject matter. The system comprises a Resource Ingestion and Preprocessing module configured to collect a plurality of resources or documents related to a particular topic from a plurality of online sources, or content provider. A key-information related to the particular topic is extracted from the plurality of resources or documents. A raw text, a plurality of words tagged with a position information and a plurality of images in the resource or document are extracted.

A parsing module is configured to parse a resource or document to extract and tag all words in the resource or document. The extracted words are tagged with a position information and a formatting information.

A Part-of-Speech (POS) tagging module is configured to classify and tag the words extracted by the parsing module into parts of speech based on a combination of rule based algorithm and a stochastic based algorithm.

A visual learning interface and data presentation module is configured to create a plurality of knowledge maps with the extracted words and images. The plurality of knowledge maps are audio-visual knowledge maps. The plurality of knowledge maps comprises a text, an image, an audio and a video notes/nodes. The visual learning interface and data presentation module is further configured to receive a plurality of knowledge maps created by a plurality of experts on a subject matter. The visual learning interface and data presentation module is further configured to combine the plurality of knowledge maps created by the user with the plurality of knowledge maps created by the plurality of experts on the subject matter to create a gold standard map for a topic on the subject matter.

A knowledge analysis module is configured for assessing an understanding of the user in a subject matter by comparing the knowledge map created by the user with the knowledge map created by teacher or expert or the gold standard map.

According to an embodiment herein, the Resource Ingestion and Preprocessing module comprises a content ingestion and pre-processing module configured to acquire the plurality of resources or documents and place the acquired documents in a document corpora. The document corpora is categorized by a subject, a topic and a unit. The content ingestion and pre-processing module is further configured to perform a pre-processing operation on the collected resources or documents to determine a type or format of the collected resources or documents. The pre-processing operation includes a text processing operation, an audio processing operation and a video processing operation. The content ingestion and pre-processing module is further configured to extract a preset information related to the resource or document. The preset information includes a topic, a file size, an author, an owner, a date created and a date modified.

According to an embodiment herein, the parsing module is configured to extract and tag all words in the resource or document except commonly used words and stop words. The commonly used words include the articles, the prepositions, the conjunctions and the interjections. The parsing module is further configured to tag the words with a position information. The position information includes a paragraph number, a line number, a column number and a row number for the text. The position information includes an actual play time in minutes or seconds for a video. The parsing module is further configured to tag the words with a formatting information. The formatting information includes a font size, a font type, a font style, a section header and a numbered list. The parsing module is further configured to assign a document formatting weights for each word in the document based on the formatting information using a plurality of typographical analysis methods. The parsing module is further configured to calculate an intra-document semantic weight of the key-phrase or word in the document using a plurality of intra-document semantic analysis methods. The parsing module is further configured to calculate an inter-document semantic weight of the key-phrase or word based on the corpus acquired by analyzing the document corpus. The parsing module is further configured to combine the inter-document semantic weight and the intra-document semantic weight to create an aggregate semantic weight of the key-phrase or word in the document. The parsing module is further configured to update the aggregate semantic weight of the key-phrase or word based on the document formatting weights determined by the typographical analysis. The parsing module is further configured to collect and save the updated aggregate semantic weights for the words in the acquired or collected documents in a database.

According to an embodiment herein, the Part-of-Speech (POS) tagging module is configured to execute a plurality of training and analyzing algorithms to classify the words extracted by the parsing module with the parts of speech. The words are classified based on a definition of the word and a context of the word in a phrase, a sentence, or a paragraph. The words are tagged with Part of Speech (POS) tags. The POS tags include the nouns, the verbs and the adverbs.

According to an embodiment herein, the visual learning interface and data presentation module is configured to present the key-phrases, the words and the images extracted from the resource to the user in synchronization with a presentation of the resource. The visual learning interface and data presentation module is configured to allow the users to drag and drop the extracted keywords onto the knowledge map on a user device to create a plurality of nodes on the knowledge map. The visual learning interface and data presentation module is configured to create a plurality of nodes on the knowledge map by dragging the key-phrases onto the map. The visual learning interface and data presentation module is configured to edit a text on the node based on a user requirement or need. Only the text is modified while a tagged data associated with the node is retained. The visual learning interface and data presentation module is configured to connect the plurality of nodes to each other using the linking phrases. The visual learning interface and data presentation module is configured to add a semantic information to each of the nodes. The visual learning interface and data presentation module is configured to establish a relation between the two nodes. The nodes are converted from a speech to a text and played back during a review mode. An audio node is created instead of an image node, or a text node and played back when the node is selected. A video node is created so that an external video is played when the node is selected. The image nodes, the drawing nodes and the equation nodes are created on the knowledge map. The constructed knowledge map is edited using the editing tools to change the shapes, the colors and the link types. The constructed knowledge map is saved and retrieved at any time.

According to an embodiment herein, the system further comprises a map analysis module configured to analyze a plurality of conceptual connections in the knowledge map. The map analysis module is configured to acquire a map data of the user knowledge map. The map data comprises a plurality of concepts and a plurality of links between the pluralities of concepts. The map analysis module is configured to generate a knowledge map automatically from the corpus of the existing maps for a topic. The map analysis module is configured to allow a teacher to create a knowledge map for comparison with the user created knowledge maps. The map analysis module is configured to estimate a semantic closeness of the knowledge map created by the user to the teacher created knowledge map and/or the knowledge map generated from the corpus by using the template-based methods and statistical methods. The map analysis module is configured to extract and store a plurality of areas in the knowledge map created by the users to identify a portion that is difficult to comprehend or requires additional background information. The map analysis module is configured to forward the extracted information to the teacher for use in the follow-up classes or to redesign, re-purpose, or re-present a study material to the class. The map analysis module is configured to guide a user through a process of creating a knowledge map until the user completely grasps and constructs an accurate knowledge map of the topic. The conceptual connections made by the user are analyzed to evaluate a conceptual understanding of a topic with respect to the expected semantic meaning of a connection to enable a teacher evaluate a user learning process even before conducting a test.

According to an embodiment herein, the system is configured to provide a platform for learning for children with special needs.

According to an embodiment herein, the system is configured to provide a platform for searching knowledge in the form of interactive audio-visual knowledge maps.

According to an embodiment herein, the visual learning interface and data presentation module is configured to highlight the key-phrases in the knowledge maps in conjunction with audio to anchor concepts in a user memory to help recall and learning.

According to an embodiment herein, the system further comprises the ontology/dataset processing module configured to generate an ontology/dataset for a specified category and to map a data on a newly received resource to the already created ontology/dataset.

According to an embodiment herein, the system comprises a Resource Ingestion and Preprocessing module, a Parsing module, a Part-of-Speech Tagging Module, a Knowledge Engine, and a Visual Learning Environment. The system is configured to collect, from the user or content provider, a plurality of resources related to a particular topic and to extract relevant information from the plurality of resources. The extracted information is used to construct a knowledge map in the form of interactive audio-visual notes. The system automatically generates and provides a plurality of text key-phrases present in the plurality of resources to enable the user to construct a knowledge map very quickly and easily. The system further automatically generates and provides a plurality of visual material such as images from the plurality of resources to the user to construct a knowledge map quickly and easily. The system further provides a material highly relevant to the plurality of resources within the context of the topic for which the knowledge map is being constructed.

According to an embodiment herein, the Parsing Module of the system is configured to automatically determine the format and type of a resource, extract relevant information about the resource such as file size, author, owner, date created and so on. The system is further configured to extract and tag all the words in the document barring commonly used words such as "in", "the", "of" and so on. The words are tagged with a position information and formatting information, if any. The system is further configured to extract raw text and embedded images from the resource. According to an embodiment herein, the position information includes paragraph number, line number, column number and row number for text. According to an embodiment herein, the position information includes an actual play time in minutes and seconds or in seconds for a video. According to an embodiment herein, the formatting information includes a font size, a font type, a font style, section header, etc.

According to an embodiment herein, the Part-of-Speech or POS-tagging module uses a plurality of training and analyzing algorithms to classify the words extracted by the Parsing module with parts of speech. The classification is done based on the definition of the word and its context in a phrase, sentence, or paragraph. A combination of rule-based and stochastic based algorithms are used for POS tagging. The POS module is configured to support a plurality of languages including English, Hindi. Spanish, French and Chinese among several other languages. Each of the language models is trained by a plurality of training modules to improve POS tagging for the language.

According to an embodiment herein, the Visual Learning Environment or data presentation module of the system is configured to provide an interface for the user to create and personalize the knowledge maps by using images, words, and key-phrases extracted by the data collection and extraction module. Data is presented to the user in synchronization with the source material as it is consumed by the user. Improved comprehension, learning and recall of the source material is addressed using key-phrase highlighting and image presentation in conjunction with audio, or in-situ highlighting in the documents that do not contain audio. Speech to text is available for text-only documents and is used as an additional cue to help improve learning and recall.

According to an embodiment herein, the Knowledge Engine contains a plurality of modules. The Knowledge engine includes a Resource analysis module that is configured to analyze the documents as individual resources. The Knowledge engine further includes a Topic/Category Analysis Module that is configured to analyze a document as a part of a document corpus containing a set of documents on the same subject. The Knowledge engine further includes a Clustering and Classification module that attempts to automatically categorize or classify a document with or without a-priori information about the category that it belongs to. The Knowledge engine further includes a User Interaction Module that collects and analyzes the user's interaction with the Visual Learning Environment during the process of creating a Knowledge map. The module determines the type and nature of a learner. The Knowledge engine further includes an Ontology and Dataset analysis and generation module that is primarily used to create ontologies for K-12 (Kindergarten-12$^{th}$ standard) and higher-education subjects in particular. The Knowledge engine further includes a map analysis and generation module that is used to automatically create the maps for a resource or a topic to analyze the user maps and to use the expert inputs to create the conceptual and visual summaries of the resources and the topics. The Knowledge engine further includes an automatic assessment module to analyze a student's understanding of a concept, topic or subject and to guide the learner through the process of understanding and grasping knowledge. The Knowledge engine further includes a visual search module to search a plurality of maps and to analyze the knowledge inherent in each of these maps in order to return the most relevant maps in response to a search query.

According to an embodiment herein, the automatic assessment module of the system is configured to determine a student's conceptual understanding of a topic in comparison with that of a teacher's knowledge map or a gold standard knowledge map of the topic. A gold standard Knowledge Map is the visual map that best represents the concepts and conceptual connections contained in the resource or the topic. The assessment module automatically analyzes the conceptual connections made by the student in the knowledge map to determine how close these concepts and connections are to the expected meaning of a connection. The information enables the teacher to measure a student's progress during the process of note taking and without actually conducting a test.

According to an embodiment herein, the system is configured to search the plurality of resources and the plurality of knowledge maps. The search engine is designed to use a plurality of contextual (implicit or explicit) connections between the concepts within the plurality of knowledge maps and the plurality of resources to provide the users with a list of maps in a visual format so that they may very quickly decide which of these maps contain knowledge that is most relevant to their needs.

According to an embodiment herein, the user interactions with the Visual Learning Environment are collected and analyzed in conjunction with the data in the user's knowledge maps. This data is used to determine the efficacy and usability of the user interface and in the analysis of learner-styles and learner-types for all learners including and especially those with special needs. The learner style determines how the learner creates and interacts with the knowledge map. The learner type determines whether the learner is a visual learner, auditory learner, or kinesthetic learner. The goal of the analysis is to determine the type of information and how the information is presented to the learner to match the individual's learning type and style.

According to an embodiment herein, knowledge maps are generated automatically for each resource and for each topic. A resource is a collection of documents on a specific topic. The system further analyzes the user maps that have been created for the resource or topic. The system further uses the expert inputs to automatically validate the generated maps and to improve the accuracy of the analysis results. Based on this analysis, the system produces the visual conceptual summaries of a resource or a topic for use with various applications including but not limited to a student assessment, visual search and ontology creation.

According to an embodiment herein, the conceptual connections that exist in the resources and in knowledge maps are used to generate the datasets and ontologies for a topic. The system further provides an interface for the experts to modify, add, or correct the datasets and the ontologies to produce the highly accurate representations of formalized knowledge.

The various embodiments herein provide a method to use a plurality of online sources to create, present, organize, share and analyze knowledge on a subject matter in the form of interactive audio-visual notes in a single web or tablet based platform. The method for creating an interactive audio visual map comprises the following steps. The key-phrases, words and images extracted from the key-phrase extraction process are presented to the user in synchronization with the presentation of the resource. The user drags and drops the extracted keywords on to the knowledge map and creates a node. The user is enabled/allowed to create several nodes by dragging the key-phrases onto the map. The text on the node can be edited based on a user requirement or need. Only the text is modified while the tagged data associated with the node is retained. The user then connects the nodes to each other using the linking phrases. For example, when the two nodes "photosynthesis" and "water" exist on the map, the user connects the node "photosynthesis" to the node "water" with the linking phrase "requires" or "needs". The process adds a semantic information to each of the nodes and a relationship is clearly established between the two nodes. The user is allowed to have the nodes converted from speech to text and played back during a review mode. Instead of using a suggested key phrase, the user is allowed to create the nodes with text of his/her choice. The user is further allowed to create an audio node instead of an image node or text node that is played back when the node is selected. The user is further allowed to create a video node so that an external video is played when the node is selected. The user is further allowed to create an equation node for mathematical equations and formulae. The user is further allowed to create a drawing node to add simple drawings to the knowledge map. The user continues to consume the resource while presenting the data in synchronization with the resources, creating nodes, and editing existing nodes until the entire resource is consumed. The user is allowed to select other online resources for viewing and to use the data associated with these resources to add to the existing map. The user is able to edit the constructed knowledge map using editing tools to change shapes, colors, link types and so on. The map is saved and retrieved at any time.

According to an embodiment herein, the method for collecting the documents from various sources and extracting the information/content from the collected documents comprises the following steps. The documents are acquired from the various sources and placed in a document corpora categorized by subject, topic and unit. The font information such as name, type, frequency and size are collected. The document formatting information such as headers, numbered lists, etc., are collected. The document formatting weights for each word in the document are assigned based on the document formatting information using typographical analysis methods. The semantic weights of the key-phrases in the document are calculated using several intra-document semantic analysis methods. The document corpus is then analyzed to calculate inter-document semantic weights of the key-phrases based on the corpus. The inter-document and intra-document weights are combined to create semantic weights of the key-phrases in the document. The semantic weights of the words are then updated based on the document formatting weights determined by the typographical analysis. The final semantic weights for the words in the acquired or collected documents are updated and saved.

According to an embodiment herein, the method to analyze the conceptual connections in a visual map comprises the following steps. The student's map data consisting of the concepts and the link, or relations, between the concepts is acquired. A knowledge map is generated automatically from the corpus of the existing maps for a topic. Alternatively, a teacher creates a knowledge map to be used for comparison for a topic. The semantic closeness of the student's map to the teacher's map and/or the map generated from the corpus is determined or estimated by using the template-based methods, statistical methods and other methods. The areas in the students' knowledge maps that indicate difficulty in comprehension of the material or the use of more background information are extracted and stored. The extracted information is then provided or forwarded to the teacher to be used in the follow-up classes or to redesign, re-purpose, or re-present the study material to the class. The student is automatically guided through the process of creating a map until he/she completely grasps and constructs an accurate knowledge map of the topic. The assessment module analyzes and compares the conceptual connections made by the student while taking notes using the platform. This information enables the teacher or the student to determine or evaluate a conceptual understanding of a topic with respect to the expected semantic meaning of a connection. The teacher has access to visual data, that is the map to determine how well a student is learning before he/she actually takes a test. The system has the unique feature to determine how well a student is learning while he/she is learning rather than after a formal assessment through quizzes.

According to an embodiment herein, a method for Automatic Generation of Visual Summaries using an algorithm is provided. The process steps for performing the automatic generation of visual summaries are as follows:
a) A resource is selected by the user for automatic map creation using the application's UX/UI or specified as part of a batch processing job.
b) A template map is then auto-generated using the following steps:
  a. Typographical data in structured text is used to determine text structure.
  b. Keywords are weighted and tagged based on their positions within the text.
  c. The generated relations between keywords have used word sense disambiguation and anaphora resolution to determine if a keyword has multiple relations. These relations will form nodes where there is one parent node and two or more child nodes that may or may not be connected by linking phrases.
  d. A hierarchy is created following a graph-like textbook structure: Filters that can be set by the user, such as keyword weight, parts of speech, and number of nested levels are used to determine exactly what is placed on the map.
  e. Nodes are created and placed in the visual summary:
c) The auto-generated summary is edited by an expert to create a template that can be shared with learners.
d) The template can optionally generate a cluster of keywords around each section/subsection title for expert users to modify and create their own connections between keyphrases.

According to an embodiment herein, the typographical data in structured text is used to determine text structure. Font sire, font style, font types and font frequencies are determined for each keyphrase to be used. For each font size, family and type, a score based on the inverse of the font frequency, is used to create a typographical weight. This score is combined with the keyphrase weight extracted from the semantic analysis engine to create a new weight: One method is to use a simple average of the semantic keyphrase weight and the typographical weight as the new computed keyphrase weight.

According to an embodiment herein, Keyphrases are tagged based on their occurrence within the text. Tags specify the following:
a) The sentence number in which the keyphrase occurs.
b) The type of header in which the keyphrase is present—in a document title, in a chapter heading, in a section heading or in a subsection heading.
c) The type of non-header text to which it belongs—in an itemized list, in an emphasized sentence or in a block of text. Keyphrases that are in headers will form parent nodes in the visual summary.
d) The lowest level (or subsection) to which it belongs.

According to an embodiment herein, the generated relations between keyphrases have used word sense disambiguation and anaphora resolution to determine if a keyphrase has multiple relations. These relations form nodes where there is one parent node and two or more child nodes that are either connected or not connected by linking phrases i.e., a linking phrase may be blank. For instance the following pair of sentences "John went to the store. He bought a torch" would result in an intermediate pair of relations: John→went to→store and "John→bought→torch" and finally a single parent node "John" and two child nodes "store" and "cycle" with the linking phrases "went to" and "bought".

According to an embodiment herein, a hierarchy is created following a graph-like textbook structure: The video/book/content title is considered to be the root. This title is part of a larger, logical, hierarchy (Subject→Topic→Title). Sections and subsections form the rest of the hierarchy. The lowest level varies from document to document. Non-header keyphrases are organized in a hierarchy of clusters that correspond to the section or subsection to which they belong starting with the lowest level in the hierarchy. That is, they are clustered only around the lowest sub-section header to which they belong.

According to an embodiment herein, Filters that have been set by the user, such as keyphrase weight, parts of speech, number of nested levels and so on are used to determine exactly what is placed on the map. For instance, the user is enabled to configure the filter to display only nouns and limit the number of nested levels to two.

According to an embodiment herein, Nodes are created in the visual summary: The keyphrase in the title, or the title itself forms the root node in the map. Each keyphrase in a header or sub-header will be placed in a node on the map based on the hierarchy—subsection headers appear lower than section headers. The title node is connected to the section nodes and the section nodes are connected to the subsection nodes. This process is repeated for each subsection in the document to create a tree based on section/subsection headers which form the principal nodes of the initial connected map. Keyphrases that are not headers are placed as a cluster of nodes beneath the section/subsection headers to which they belong.

According to an embodiment herein, each keyphrase in the cluster is connected to the section/subsection header to which it belongs. The sentence number of each keyphrase in the cluster is used to determine additional hierarchies within the cluster. Two keyphrases within the same sentence number appear at the same level in the hierarchy. The relations that have been generated by the semantic analysis engine are used to add linking phrases between nodes on the map and to combine any node that forms multiple relations at the same level as noted above in para 0070. The linking phrases may be between a node in the cluster and the section header or between two nodes in the cluster. Any loops that are created by the linking process are removed.

The auto-generated summary is edited by an expert to add, modify or remove nodes and linking phrases to create a template that can be shared with learners.

The auto-generated template, or the expert-modified template, is now used to make a comparison with a user created map for automatic grading. The auto-generated template, or the expert-modified template, is further used as the basis for creating a "gold standard" map.

According to an embodiment herein, a process of creating a gold standard map is provided. The process steps for creating a gold standard map are as follows: To Generate a gold standard map of document, the auto-generation map module is used to create a visual summary of the map; all Subject Matter Expert (SME) created maps are used based on the document; and all student created maps of the document are used.

According to an embodiment herein, Subject Matter Expert (SME) created user maps. The process steps for creating user maps of a Subject Matter Expert (SME) are as follows:
 a) The SME starts with a copy of the auto-generated map.
 b) If filters are used, all extracted keyphrases are not placed as nodes on the map. The SME either modifies the filters or drag and drop keyphrases using the Data panel in the application's user interface to create new nodes and connections in their copy of the map.
 c) The expert user adds a phrase that exists in the original text but not flagged as a keyphrase by manually entering it or by dragging/dropping the word from the keyphrase panel.
 d) The expert user removes nodes and linking phrases from the auto-generated map.
 e) The expert user modifies node text and linking phrases in the auto-generated map.

According to an embodiment herein, the maps are analysed. The process steps for analyzing maps are as follows:

Each map added to the corpus of expert maps is processed to determine:
 a) The set of auto-generated keyphrases that are included in the map.
 b) The set of words that are included in the text but not flagged as keyphrases by the semantic analysis engine.
 c) The TF/IDF measure of keyphrases in the map corpus that includes SME maps, user maps and the gold standard map.

According to an embodiment herein, Keyphrase Weights are updated. The process steps for Updating Keyphrase Weights are as follows: Intra-document and category keyphrase weights in the database are increased by a small factor based on the following criteria:
 a) Presence in the map corpus and in the auto-generated set of keyphrases.
 b) Presence in the expert map corpus but not in the auto-generated set. The keyphrase weight is arbitrarily set to 0.5.
 c) The TF/DF measures in the corpus if it exceeds a pre-se threshold.
 d) The category weights are recalculated based on the updated intra-document weights.
 e) An ordered list of keyphrases and relations that are in the auto-generated map are created based on the weights of the keyphrases and the highest weight of the keyphrase in each set of relations.

According to an embodiment herein, the Gold Standard Map is updated. The process steps for Updating the Gold Standard Map are as follows:

a) The first gold-standard map is the original auto-generated map and each newly added or updated expert map is compared with the gold standard map. The expert map is checked to see if it meets the following thresholds: At least 80% (configurable) of the original keyphrases from the gold standard map are present in the Subject Matter Expert map. Or at least 50% (configurable) of the original relations from the gold standard map are present in the Subject Matter Expert map.
 b) If it does not meet these thresholds, it is not considered for the creation of the gold standard map.
 c) All nodes and relations that are in the retained Subject Matter Experts (SME) maps and gold standard map are retained in the gold standard. The weights of keyphrases in these nodes are increased by a small fixed value
 d) Any nodes and relations that are in the expert map but not in the auto-generated map are added to the gold standard map. This includes expert added linking phrases.
 e) Any nodes and relations that are removed by the expert are retained in the gold standard map. However, the weights of keyphrases in these nodes are decreased by a small fixed value.
 f) The ordered list from para [0080], section e, mentioned above, is modified based on the newly calculated weights. This uses the set of relations/keyphrases from the original auto-generated map.
 g) Any keyphrases/relationships that fall below a pre-defined threshold is removed from the gold-standard map. These are reinserted if they meet the threshold when more maps are added.
 h) The updated gold standard map is saved, and the process is repeated with each added expert map.
 i) The difference between maps, or delta, at each update between the original auto-generated map and the gold-standard map is retained and tracked so that maps from previous iterations are recovered and used for comparison.

According to an embodiment herein, the Student creates Maps. The process steps for generating Student Created Maps are as follows: Since Subject Matter Experts may or may not share their versions of the map for use by learners, the student created maps are highly varied in the nature of the visualization as they are, started, more often than not, from a blank canvas or a basis map that is provided by the teacher. The teacher begins with the gold-standard map and modifies it to suit his or her needs. The teacher then has the option of hiding nodes and relations and removing or editing keyphrases in the nodes on the map to create a basis map, or template. This template is shared with students who use it to create their own maps.

According to an embodiment herein, Students use the Data panel in the Application's user interface, to add keyphrases, as nodes, to their maps starting either from a blank canvas or from a teacher provided basis map. Students can add, modify, or delete nodes and linking phrases to create their own conceptual summaries.

According to an embodiment herein, User maps added to the corpus of student maps are processed to determine the set of auto-generated keyphrases that are included in the map; the set of auto-generated relations that are included in the map; and the TF/IDF measure of keyphrases in the map corpus that includes expert maps, user maps and the gold standard map.

According to an embodiment herein, the process steps for Updating the Gold Standard Map are as follows: The first gold-standard map is the original auto-generated map and each newly added or updated user map is compared with the gold standard map.
  a) Then The student map is checked to see if it meets the following thresholds: At least 80% (configurable) of the original keyphrases from the gold standard map are present in the user map; or At least 50% (configurable) of the original relations from the gold standard map are present in the user map; and a similarity measure based on the above two points and difference between the map nodes and relations is saved with the expert map.
  b) If it does not meet these thresholds, it is not considered for the creation of the gold standard map.
  c) All nodes and relations that are in the retained learner maps and in the gold standard map are retained in the gold standard. The weights of keyphrases in the nodes are increased by a small fixed value.
  d) The ordered list from para [0080], section e, in the previous section is modified based on the newly calculated weights. Note that this uses the set of relations/keyphrases from the original auto-generated map.
  e) Any keyphrases/relationships that fall below a predefined threshold will be removed from the gold-standard map. These may be reinserted if they meet the threshold when more maps are added.
  f) The updated gold standard map is saved, and the process is repeated with each added user map.
  g) The difference between maps, or delta, at each update between the original auto-generated map and the gold-standard map is retained and tracked so maps from previous iterations may be recovered and used for comparison.

According to an embodiment herein, GOLD-STANDARD and/or TEACHER MAP are used as templates for assessment and grading.

According to an embodiment herein, the process steps for Combining Keyphrase weights are as follows: Combine Keyphrase Weights: Generate keyphrase weights using the semantic analysis engine; Generate typographical weights using the typographical analysis engine; and calculate a combined weight as the average of the keyphrase weight produced by the semantic analysis engine and the weight produced by the typographical analysis engine.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
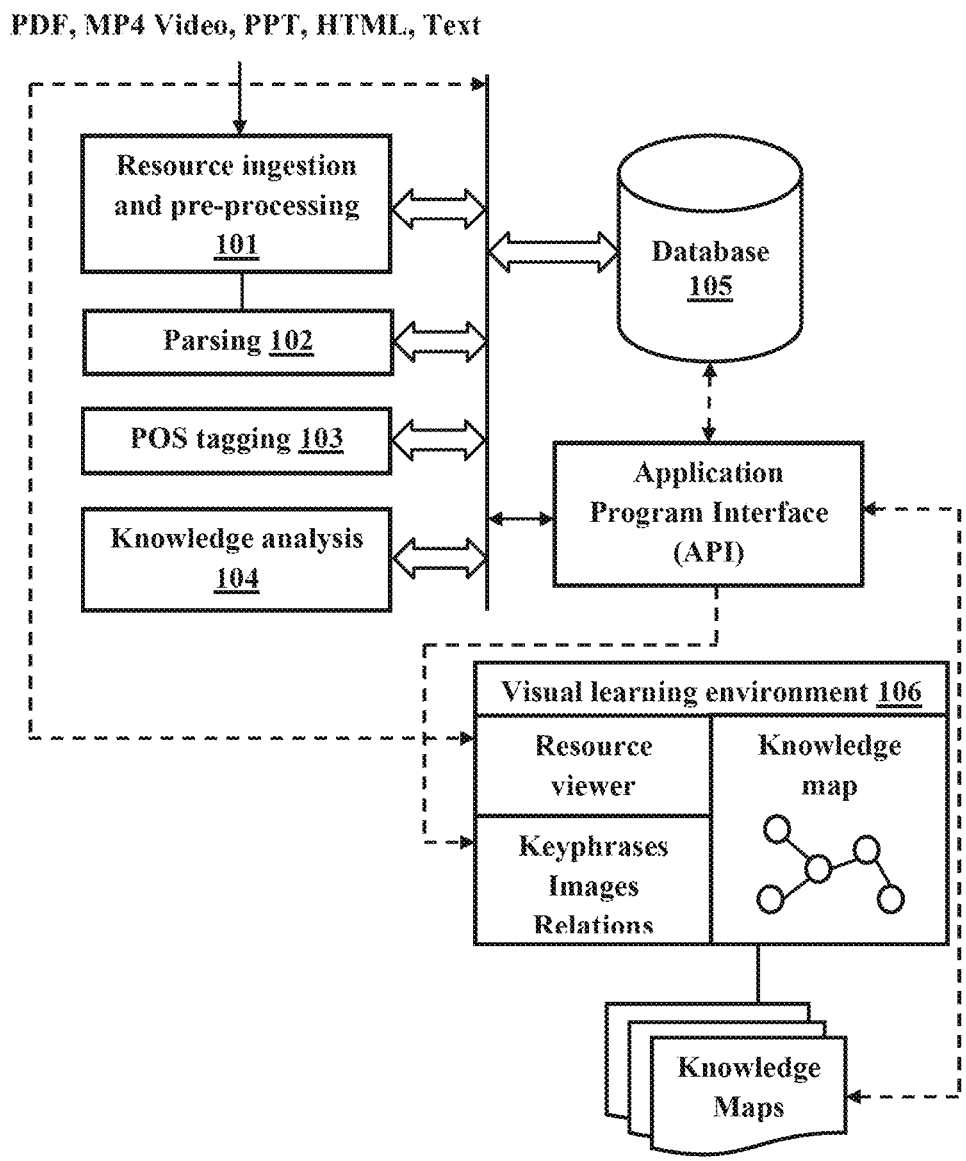
FIG. 1 illustrates a block diagram of a system to use a plurality of online sources to create, present, organize, share and analyze knowledge on a subject matter in the form of interactive audio-visual notes in a single web or tablet based platform, according to an embodiment herein.

Although the specific features of the embodiments herein are shown in some drawings and not in others, this is done for convenience only as each feature may be combined with any or all of the other features in accordance with the embodiments herein.

DETAILED DESCRIPTION OF THE EMBODIMENTS HEREIN

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system and a method to use a plurality of online sources to create, present, organize, share and analyze knowledge in a subject matter in the form of interactive audio-visual notes or maps in a single web based or tablet based platform. The system is highly integrated to ensure that both the notes and the source materials are simultaneously available on the same platform. The system further provides a conceptual and interactive interface to the content. The system makes a plurality of notes and a plurality of source materials simultaneously available on the web or tablet based platform. The user is allowed to seamlessly switch between the notes and source material. The system analyses the notes and the source material provided to the platform to determine a progress of a user while taking notes. The system further determines an accuracy of the notes and provides an instant feedback. The system enables the student to add and use the audio, visual, image, equation, drawing, text and other notes in addition to those that are suggested by the note taking solution. The system allows the user to collate the notes in a meaningful manner by using the colors, concept grouping, etc. The system further enables the user to personalize the maps developed within the same environment in which the complete notes or note snippets for a particular map are imported, edited and customized while maintaining the links back to the original source from which the imported notes are derived. The system also uses audio and keyword highlighting techniques to complement the advantages of using visual maps alone as a note taking strategy and, in doing so, helps the learners to improve learning and recall. The system further allows the learners to search for and be presented with knowledge that is inherent in the educational material. The knowledge is presented in the form of interactive, audio-visual, conceptual summaries. The system further generates the ontologies and datasets for various subjects for the mapping of domain knowledge. The system further presents an interface that works equally for all learners including children with special needs.

For the purposes of understanding the embodiments herein, the following definitions are provided for defining the terminologies used herein.

A key-phrase is text comprising one or more words that is considered important or relevant within the context of a document, document corpus, or topic.

A node is a physical entity on the map that represents a concept. The node includes, but is not limited to, an image, a color, a text phrase, a drawing, a mathematical equation, or an audio or video clip, or a link to material that best defines the concept.

A link is a line that connects two nodes. The link usually contains a linking phrase that explicitly states the relationship between the nodes. If no linking phrase is present, the relationship is implicit.

The linking phrase is a text phrase that connects two or more nodes explicitly specifying the relation between the nodes. The linking phrase is physically attached to and associated with the link.

A knowledge map is an audio-visual map comprising a plurality of nodes and links that represent a conceptual summary or understanding of a resource or a topic. Knowledge maps are similar to the concept maps and mind-maps in the visual representation of knowledge.

A resource is material comprising text, static and/or moving images. The resource could be in any format including, but not limited to, PDFs; various Microsoft documents such as Microsoft-Word: OOXML formatted documents; audio and video content in different formats such as MP4, AVI, SWF; HTML pages; and raw text.

A document is the textual content of a resource.

A document corpus is a set of documents that are typically classified into a category such as "Art Concepts", "Music Theory", or "Science".

According to an embodiment herein, a computer implemented method is provided for creating, presenting, sharing, organizing and analyzing knowledge on a subject matter. The method comprises instructions stored on a non-transitory storage medium and run on a computing device to execute the following steps. A plurality of resources or documents related to a particular topic is collected from a user or content provider. A key information related to the particular topic from the plurality of resources or documents is extracted using a Resource Ingestion and Pre-processing module. A raw text, a plurality of words tagged with position information and a plurality of images in the resource or document are extracted along with metadata about the plurality of resources.

A resource or document is parsed to extract and tag all the words in the resource or document using a parsing module. The extracted words are tagged with a position information and a formatting information. The words extracted by the parsing module are classified and tagged into parts of speech using a Part-of-Speech (POS) tagging module based on a combination of rule based algorithm and a stochastic based algorithm.

A knowledge map is automatically generated using the Knowledge engine. A plurality of user generated knowledge maps is created with the extracted words and images using a visual learning interface and data presentation module. The plurality of user generated knowledge maps is collected. The plurality of knowledge maps is audio-visual knowledge map. The plurality of knowledge maps comprises a text, an image, a mathematical equation, a drawing, an audio and a video notes/nodes. A plurality of knowledge maps is created by experts on a subject matter and received by the visual learning interface and data presentation module. The automatically generated knowledge map is combined with the plurality of knowledge maps created by the users and the plurality of knowledge maps created by the experts on the subject matter to create a gold standard map for a topic on the subject matter by using the visual learning interface and data presentation module. An understanding of the user in a subject matter is assessed by comparing the knowledge map created by the user with the knowledge map created by the teacher or an expert or an automatically generated gold standard map by the visual learning interface and data presentation module.

According to an embodiment herein, the step of collecting the plurality of resources or documents related to the particular topic from the user or content provider and extracting the relevant information comprises acquiring the plurality of resources or documents and placing the acquired documents in a document corpora. The document corpora is categorized by a subject, a topic and a unit. A pre-processing operation is performed on the collected resources or documents to determine a type or format of the collected resources or documents. The pre-processing operation includes a text processing operation, an audio processing operation and a video processing operation. A preset information related to the resource or document is extracted. The preset information includes topic, file type, file size, author, owner, date created and date modified.

According to an embodiment herein, the step of parsing a resource or document to extract and tag all the words in the resource or document using a parsing module comprises extracting and tagging all the words in the resource or document except commonly used words. The commonly used words include articles, prepositions, conjunctions and interjections. The words are tagged with a position information. The position information includes a paragraph number, a line number, a column number and a row number for text. The position information includes an actual time offset in minutes or seconds for a video or audio. The words are tagged with a formatting information. The formatting information includes a font size, a font type, a font style, a section header and a numbered list. A document formatting weights is assigned for each word in the document based on the formatting information using a plurality of typographical analysis methods. An intra-document semantic weight of the key-phrase or word in the document is calculated using a plurality of intra-document semantic analysis methods. An inter-document semantic weight of the key-phrase or word is calculated based on the corpus acquired by analyzing the document corpus. The inter-document semantic weight and the intra-document semantic weight are combined to create an aggregate semantic weight of the key-phrase or word in the document. The aggregate semantic weight of the key-phrase or word is updated based on the document formatting weights determined by the typographical analysis. The updated aggregate semantic weight for the words in the acquired or collected documents is collected and saved in a database.

According to an embodiment herein, the step of classifying and tagging the words into the parts of speech using the Part-of-Speech (POS) tagging module comprises executing a plurality of training and analyzing algorithms to classify the words extracted by the parsing module with the parts of speech. The classification of the word is done based on a definition of the word and a context of the word in a phrase, a sentence, or a paragraph. The words are tagged with Part of Speech (POS) tags and the POS tags includes nouns, verbs and adverbs.

According to an embodiment herein, the step of creating the plurality of knowledge maps with the extracted words and the images using the visual learning interface and data presentation module comprises presenting the key-phrases, the words and the images extracted from the resource to the user in synchronization with a presentation of the resource. The extracted key-phrases are dragged and dropped onto the knowledge map with a user device to create a node on the knowledge map. A plurality of nodes is created on the knowledge map by adding the image notes, adding the text nodes, the drawing nodes and the mathematical equation nodes manually onto the map. A text on the node is edited based on a user requirement or need. Only the text is modified while a tagged data associated with the node is retained. The pluralities of the nodes are connected to each other using the linking phrases. A relation is established between the two nodes. The key-phrase node is selected to retrieve the source/original document from which the key-phrase is extracted and the extracted key-phrase position in the source/original document is also retrieved. The nodes are converted from speech to text and played back during a review mode. An audio node is created instead of an image/text node and played back when the node is selected. A video node is created so that an external video is played when the node is selected. The constructed knowledge map is edited using the editing tools to change the shapes, the colors and the link types. The constructed knowledge map is saved and retrieved at any time.

According to an embodiment herein, the method further comprises analyzing a plurality of conceptual connections in the knowledge map. The step of analyzing the plurality of conceptual connections in the knowledge map comprises acquiring a map data of the user knowledge map. The map data comprises a plurality of concepts and a plurality of links between the pluralities of concepts. A knowledge map is generated automatically from the corpus of resources and the existing maps for a topic. A teacher is allowed to create a knowledge map. The teacher created knowledge map is used for an assessment of the user knowledge map. The teacher created knowledge map is used as a base map by the user for personalizing the knowledge map. A semantic closeness of knowledge map created by the user to the teacher created knowledge map and/or the knowledge map generated from the corpus is estimated by using the template-based methods and statistical methods. A plurality of areas in the knowledge map created by the plurality of users is extracted and stored to identify a portion that is difficult to comprehend or requires additional background information to help comprehend the material. The extracted information is forwarded to the teacher for use in the follow-up classes or to redesign, re-purpose, or re-present a study material to the class. The user is guided through a process of creating a knowledge map until the user completely grasps and constructs an accurate knowledge map of the topic. The conceptual connections made by the user are analyzed to evaluate a conceptual understanding of a topic with respect to the expected semantic meaning of a connection. The conceptual connections enable a teacher to evaluate a user's learning process while the user is in a process of taking notes and before conducting a formal assessment.

According to an embodiment herein, the method further comprises highlighting the key-phrases in the knowledge maps in conjunction with audio by the visual learning interface or data presentation module to anchor the concepts in a user memory to help recall and learning.

According to an embodiment herein, the method further comprises generating an ontology/dataset for a specified category with an ontology/dataset processing module and mapping a data on a newly received resource to the already created ontology/dataset.

According to an embodiment herein, the method further comprises a platform to create the interactive audio-visual knowledge maps for learning for children with special needs.

According to an embodiment herein, a system is provided for creating, presenting, sharing and analyzing knowledge on a subject matter. The system comprises a Resource Ingestion and Preprocessing module configured to collect a plurality of resources or documents related to a particular topic from a plurality of online sources, or content provider. A key-information related to the particular topic is extracted from the plurality of resources or documents. A raw text, a plurality of words tagged with a position information and a plurality of images in the resource or document are extracted.

A parsing module is configured to parse a resource or document to extract and tag all words in the resource or document. The extracted words are tagged with a position information and a formatting information.

A Part-of-Speech (POS) tagging module is configured to classify and tag the words extracted by the parsing module into parts of speech based on a combination of rule based algorithm and a stochastic based algorithm.

A visual learning interface and data presentation module is configured to create a plurality of knowledge maps with the extracted words and images. The plurality of knowledge maps are audio-visual knowledge maps. The plurality of knowledge maps comprises a text, an image, an audio and a video notes/nodes. The visual learning interface and data presentation module is further configured to receive a plurality of knowledge maps created by a plurality of experts on a subject matter. The visual learning interface and data presentation module is further configured to combine the plurality of knowledge maps created by the user with the plurality of knowledge maps created by the plurality of experts on the subject matter to create a gold standard map for a topic on the subject matter.

A knowledge analysis module is configured for assessing an understanding of the user in a subject matter by comparing the knowledge map created by the user with the knowledge map created by teacher or expert or the gold standard map.

According to an embodiment herein, the Resource Ingestion and Preprocessing module comprises a content ingestion and pre-processing module configured to acquire the plurality of resources or documents and place the acquired documents in a document corpora. The document corpora is categorized by a subject, a topic and a unit. The content ingestion and pre-processing module is further configured to perform a pre-processing operation on the collected resources or documents to determine a type or format of the collected resources or documents. The pre-processing operation includes a text processing operation, an audio processing operation and a video processing operation. The content ingestion and pre-processing module is further configured to extract a preset information related to the resource or document. The preset information includes a topic, a file size, an author, an owner, a date created and a date modified.

According to an embodiment herein, the parsing module is configured to extract and tag all words in the resource or document except commonly used words and stop words. The commonly used words include the articles, the prepositions, the conjunctions and the interjections. The parsing module is further configured to tag the words with a position information. The position information includes a paragraph number, a line number, a column number and a row number for the text. The position information includes an actual play time in minutes or seconds for a video. The parsing module is further configured to tag the words with a formatting information. The formatting information includes a font size, a font type, a font style, a section header and a numbered list. The parsing module is further configured to assign a document formatting weights for each word in the document based on the formatting information using a plurality of typographical analysis methods. The parsing module is further configured to calculate an intra-document semantic weight of the key-phrase or word in the document using a plurality of intra-document semantic analysis methods. The parsing module is further configured to calculate an inter-document semantic weight of the key-phrase or word based on the corpus acquired by analyzing the document corpus. The parsing module is further configured to combine the inter-document semantic weight and the intra-document semantic weight to create an aggregate semantic weight of the key-phrase or word in the document. The parsing module is further configured to update the aggregate semantic weight of the key-phrase or word based on the document formatting weights determined by the typographical analysis. The parsing module is further configured to collect and save the updated aggregate semantic weights for the words in the acquired or collected documents in a database.

According to an embodiment herein, the Part-of-Speech (POS) tagging module is configured to execute a plurality of training and analyzing algorithms to classify the words extracted by the parsing module with the parts of speech. The words are classified based on a definition of the word and a context of the word in a phrase, a sentence, or a paragraph. The words are tagged with Part of Speech (POS) tags. The POS tags include the nouns, the verbs and the adverbs.

According to an embodiment herein, the visual learning interface and data presentation module is configured to present the key-phrases, the words and the images extracted from the resource to the user in synchronization with a presentation of the resource. The visual learning interface and data presentation module is configured to allow the users to drag and drop the extracted keywords onto the knowledge map on a user device to create a plurality of nodes on the knowledge map. The visual learning interface and data presentation module is configured to create a plurality of nodes on the knowledge map by dragging the key-phrases onto the map. The visual learning interface and data presentation module is configured to edit a text on the node based on a user requirement or need. Only the text is modified while a tagged data associated with the node is retained. The visual learning interface and data presentation module is configured to connect the plurality of nodes to each other using the linking phrases. The visual learning interface and data presentation module is configured to add a semantic information to each of the nodes. The visual learning interface and data presentation module is configured to establish a relation between the two nodes. The nodes are converted from a speech to a text and played back during a review mode. An audio node is created instead of an image node, or a text node and played back when the node is selected. A video node is created so that an external video is played when the node is selected. The image nodes, the drawing nodes and the equation nodes are created on the knowledge map. The constructed knowledge map is edited using the editing tools to change the shapes, the colors and the link types. The constructed knowledge map is saved and retrieved at any time.

According to an embodiment herein, the system further comprises a map analysis module configured to analyze a plurality of conceptual connections in the knowledge map. The map analysis module is configured to acquire a map data of the user knowledge map. The map data comprises a plurality of concepts and a plurality of links between the pluralities of concepts. The map analysis module is configured to generate a knowledge map automatically from the corpus of the existing maps for a topic. The map analysis module is configured to allow a teacher to create a knowledge map for comparison with the user created knowledge maps. The map analysis module is configured to estimate a semantic closeness of the knowledge map created by the user to the teacher created knowledge map and/or the knowledge map generated from the corpus by using the template-based methods and statistical methods. The map analysis module is configured to extract and store a plurality of areas in the knowledge map created by the users to identify a portion that is difficult to comprehend or requires additional background information. The map analysis module is configured to forward the extracted information to the teacher for use in the follow-up classes or to redesign, re-purpose, or re-present a study material to the class. The map analysis module is configured to guide a user through a process of creating a knowledge map until the user completely grasps and constructs an accurate knowledge map of the topic. The conceptual connections made by the user are analyzed to evaluate a conceptual understanding of a topic with respect to the expected semantic meaning of a connection to enable a teacher evaluate a user learning process even before conducting a test.

According to an embodiment herein, the system is configured to provide a platform for learning for children with special needs.

According to an embodiment herein, the system is configured to provide a platform for searching knowledge in the form of interactive audio-visual knowledge maps.

According to an embodiment herein, the visual learning interface and data presentation module is configured to highlight the key-phrases in the knowledge maps in conjunction with audio to anchor concepts in a user memory to help recall and learning.

According to an embodiment herein, the system further comprises the ontology/dataset processing module configured to generate an ontology/dataset for a specified category and to map a data on a newly received resource to the already created ontology/dataset.

FIG. 1 illustrates a block diagram of a system to use a plurality of online sources to create, present, organize, share and analyze knowledge in the form of interactive audio-visual notes in a single web or tablet based platform, according to an embodiment herein. The system comprises a Resource ingestion and Preprocessing module 101, a Parsing Module 102, A POS Tagging Module 103, and a Knowledge Analysis Engine 104. The information extracted by these modules is used to construct an audio-visual knowledge map using a Visual Learning Environment 106. The system automatically generates and provides a plurality of text key-phrases present in the plurality of resources that are used in the construction of a knowledge map. The system further automatically generates and provides a plurality of visual material such as images from the plurality of resources that are used in the construction of a knowledge map. The system further provides a material highly relevant to the plurality of resources within the context of the topic for which the knowledge map is constructed. The Document/resource Ingestion and Preprocessing module 101 is configured to collect a plurality of resources relating to a particular topic from the user or content provider. The parsing module 102 is configured to parse the plurality of collected resources/documents to extract metadata, formatting information, text and images. The extracted textual and image content of the resource is then processed by the POS tagging module 103 to tag the Parts-of-Speech in the extracted text from the collected resources/documents. The extracted Metadata, formatting information, the text and images are further processed by the knowledge analysis engine 104 to extract relevant information from the plurality of resources. The extracted information is stored in the database 105. The extracted and stored information is used for constructing an audio-visual knowledge map 107. The Knowledge Analysis Engine module automatically generates and provides a plurality of text key phrases present in the plurality of resources that are used in the construction of a knowledge map. The module further automatically extracts and provides to the user a plurality of visual material such as images, from the plurality of resources. The module further provides material highly relevant to the plurality of resources within the context of the topic for which the knowledge map is being constructed. The system is designed to execute the process of using extracted information to construct a knowledge map in an effortless manner.

Figure 2:
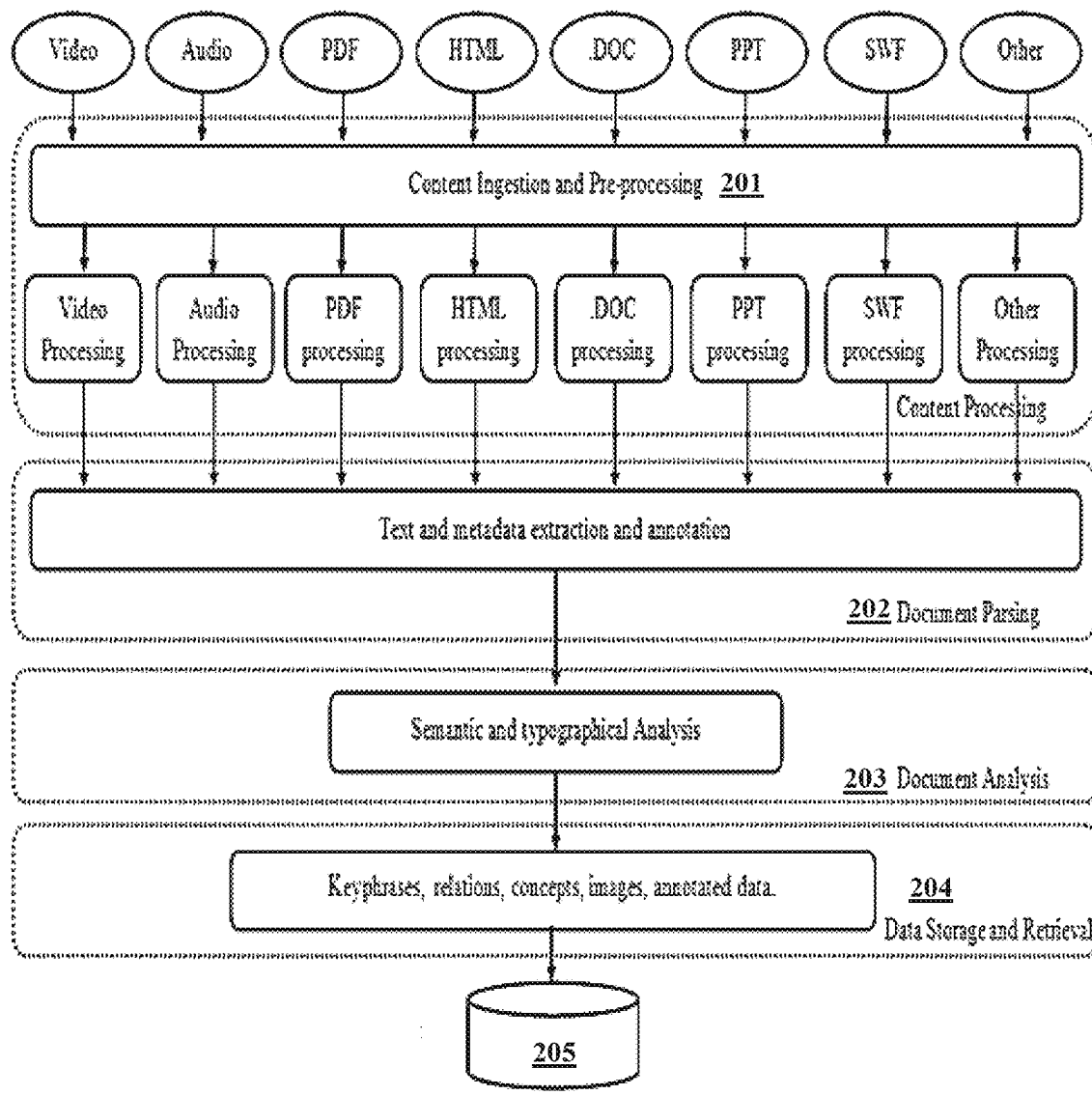
FIG. 2 illustrates a block diagram for a data collection and extraction module of the system, according to an embodiment herein.

FIG. 2 illustrates a block diagram of the information collection, extraction and analysis module of the system, according to an embodiment herein. The information collection and extraction and analysis module of the system further comprises a resource ingestion and preprocessing module 201, a resource parsing module 202, a document analysis module 203, a data storage and retrieval module 204 and a database 205.

With respect to FIG. 2, the resource ingestion and preprocessing module 201 of the information collection, extraction and analysis module of the system is configured to collect the plurality of resources provided by the user. The plurality of resource materials is preprocessed before undergoing a parsing procedure. The preprocessing module 201 is configured to determine the type and format of the resources. The module 201 further extracts metadata for the plurality of resources, for example author name, date created/modified, file size (in bytes or frames) and other associated information that may be available.

The platform provides the user with an upload/add option to select a file from a local disk, or from cloud-based storage, or to select a resource from a content library, or to select a resource/document on the web for adding to the visual mapping platform. The user is allowed to upload and use multiple resources/documents of varying formats such as video, PDF, MS-Word, HTML, etc., to create a single set of notes on a topic. The selected resource or a pointer to the resource is sent to the resource ingestion and preprocessing module that resides on a server at the back-end. The resource ingestions and pre-processing module determines the type and format of the selected resource automatically so that the resource is parsed correctly. The extracted textual and image content of the resource is then processed by the parsing module, POS tagging module, and knowledge engines. The user interface that enables the resource upload and analysis process is tailored for a client-specific web site, a personal device, or the Internet at large. The resource formats supported by the platform include, but are not limited to, PDF, Microsoft-content such as PowerPoint presentations, Word documents, etc., audio and video files with various container formats and compression standards, and the like. The pre-processing module further checks whether the resource has been already uploaded. If the resource has been already uploaded, the module notifies the user.

With respect to FIG. 2, the resource parsing module 202 of the information collection, extraction and analysis module of the system is configured to extract text along with additional formatting information from the plurality of processed resources. The extracted text is annotated with the formatting information such as font size, font style, font type, location, and position information such as time (for video or audio), page numbers, line numbers, paragraph numbers (for documents other than video and audio), and row and column locations where applicable. The document parsing module 202 is configured to extract metadata from the plurality of resources. For example, the module obtains information on the number of pages or number of time segments contained in the file. The module further extracts raw text that best represents the educational content contained in each resource. For example, the module extracts or uses a speech transcript for a video. The module 202 adopts a speech recognition technique to convert a speech to a text, when the speech transcripts are not available. The module 202 separates the extracted text into segments such as a page, section, or chapter for static, textual, content and time segments for dynamic content such as video or audio. The embedded time codes, if available, are used to sort the data into pre-defined time segments for dynamic content. If time codes are not available, scene changes in the video are used to determine the duration of a segment. The module 202 further extracts and tags relevant objects such as embedded images, text in image form and diagrams from the plurality of resources and saves the location information such as page number, geometric offset, etc., along with the extracted content. In the case of a video resource, the module extracts the key frames using the shot and scene detection algorithms. The module is also configured to process the video frames to extract and separate objects—people, text, etc.,— which are tagged with the video frame number, timestamp and object type where possible. The module 202 converts the key frame images into thumbnails. The module 202 further saves a timestamp for each key-frame image and thumbnail. For key frames which represent video shots, the module saves a time range instead of the timestamp. The module further tags each resource with the information obtained during the aforementioned process.

According to FIG. 2, the document analysis module 203 of the information collection, extraction and analysis module of the system is configured to extract key-phrases from the text extracted from the plurality of resources. The document analysis module 203 utilizes the metadata information obtained from the resource parsing module to more efficiently identify the key-phrases from the plurality of resources. The document analysis module 203 adopts an ensemble set of semantic analysis algorithms to enhance the quality of the key-phrases that are extracted from the plurality of resources. A document consists of words in varying fonts and sizes. The visual presentation of words (for instance, italics, footnotes, or chapter headings) communicates inherent semantic information that is determined by typographical analysis. The analysis module 203 uses the semantic analysis in conjunction with the typographical analysis on the extracted data from the document parsing module to assign weights to the extracted key data. The analysis module 203 further adopts an intra-document and document corpus or topic analysis to assign final weights to the key data. The relations of the extracted key-phrases and document concepts are also extracted or inferred and placed in the database 205.

According to FIG. 2, the document analysis module 203 implements several analysis algorithms. The first analysis algorithm is configured for intra-document key phrase extraction, while the second analysis algorithm is configured for inter-document key phrase extraction. The third analysis algorithm is configured to extract a relationship between the plurality of key phrases extracted by the first and second algorithms. The fourth analysis algorithm is configured to analyze the conceptual connections or relations between the key-phrases extracted by the first analysis algorithm to generate a visual and conceptual summary in the form of a knowledge map. The Fifth analysis algorithm analyzes sections of the document such as pages, time segments (in the case of video) and chapters, and so on to summarize the text as a set of concepts that are described in the section or in the specified time segment. For instance, when a page explains the concept of "photosynthesis", the set of extracted key-phrases and relations are tagged with the concept "photosynthesis".

With respect to FIG. 2, the first analysis algorithm performs a plurality of analyses on the extracted text from the resources. The plurality of analyses includes, but is not limited to, a Semantic Vectors Analysis, a Page Rank Analysis and a Formatting Information Analysis. For each resource, the document analysis module performs the following actions.

The text extracted from the document parsing module is cleaned up and transformed by performing a plurality of operations on the text. The plurality of operations comprises expanding contractions included in the text, converting curly quotes to ASCII Quotes and converting the diacritical marks to ASCII. The examples for expanding contractions included in the text includes, but is not limited to, expanding words such as "aren't" to "are not", and "isn't" to "is not", etc.

The non-ASCII characters are removed from the extracted text. Further, the words containing diacritics and curly quotes are converted to ASCII text. Further, the characters which are client specific and unnecessary are deleted, for example, the words contained in angular brackets which denote a text that is not useful for semantic analysis. The words which are not semantically important, for example "of", "if", in the context of the resource are deleted. These words are called Stop Words and are varied based on subject matter. The interjections such as "argh", "uh" are removed from the text.

The link-back information obtained from the document parsing module is added to each word in the set of words in the text. For each word in the text, the position/location in the resource/document is determined. For example, a page number, a geometric offset, a time offset of the selected word is estimated. Further, the URL and the path name of the resource are obtained by the module. Each word in the text is tagged with the location and position information which links the word back to its position in the resource.

The formatting information for each word of the extracted text is determined/identified. Speech transcripts do not typically contain formatting information and are therefore not available for processing formatting information unlike other formatted documents such as PDFs. Therefore, the speech transcripts are excluded from this step of the process. The formatting information contains specification on font type, such as underline, bold, italic; font family, such as Times New Roman; font size, and formatting type such as header text, paragraph text, and list item. Each word in the extracted text is tagged with format information for further processing.

The words are further tagged with Part of Speech (POS) tags such as nouns, verbs, adverbs and the like. The tagging of text produces an array of sentences from the text, an array of tagged sentences with each word tagged with a POS, and a two-dimensional (2-D) array of tagged tokens for each sentence.

The short sentences, such as sentences having less than four words, are ignored and assumed to be typical interjections, for example, interjections such as "Good morning".

The text is further processed to extract the phrases, dates and quotations from each sentence in the text. The extracted phrases are categorized based on a plurality of factors, such as adjective(s) followed by noun(s), series of nouns, series of adjectives, phrases in the form noun(s), phrases in the form noun(s) of the noun(s), dates and words within quotes and the like.

The extracted key-phrases are stored in the database along with the respective tags. The tag for each key-phrase is retrieved from the database when the intra-resource key-phrases are combined with the inter-resource key phrases. The intra-resource key-phrases are scored based on their relative importance within the document. The duplicate key-phases are deleted by ignoring cases. The intra-resource key phrases are normalized by summing up the key-phrase scores to 1. The n-grams (n=1, 2, 3) are extracted and persisted. The formatting information is used to determine the font frequencies. The score for each key-phrase is assigned based on the formatting information and frequency of occurrence of font types, sizes and families. The score obtained based on the font information is combined with the scores of intra-resource key-phrases. The scores for the plurality of key-phrases are saved in the database.

The inter-document keyword extraction is performed by adopting a category analysis procedure using the Log Likelihood Ratio (LLR) scores. The category analysis procedure creates a plurality of categories. For each category, the category analyzer creates a category for document mapping. For each resource, the procedure reads the n-grams (for n=1, 2, 3) persisted in the intra-document keyword extraction. While loading the unigrams for the required key-phases, the unigrams are stemmed. The stemming process is useful while combining the inter-document keywords with the intra-resource keywords. The respective LLR score is computed in each category for each unigram. Within each category, the LLR scores of the keywords are normalized and persisted. The inter-document scores or category scores are stored with each key-phrase.

The Relation Extraction algorithm is configured to automatically extract the relations for the plurality of key-phrases from the text. The Relation extraction algorithm is further configured to calculate the semantic weights of the relation between the key-phrases. The relations between the pluralities of key-phrases is estimated by identifying the phrases such as "is a", "part of" and other connecting phrases in the document. The algorithm uses the data mined from the user maps to extract the explicit and implicit relationships between the concepts or key phrases on the knowledge map. The relationship extraction is part of a continuous feedback loop that uses automatically generated data combined with user or crowd-sourced data to continuously update the weight of the relations between key-phrases. The weight is specified as a semantic distance and is based on spatial or temporal distances between the key-phrases and also how close they are to each other in meaning. The spatial distance on the knowledge map is based on the number of links and linking phrases that connect the two key-phrases. The Relationship Extraction algorithm further uses the spatial separation or temporal separation of key-phrases within the resource from which they are derived. The spatial distance within a non-audio-video resource is specified for instance, by the number of words, pages, or paragraphs that separate two key-phrases in a resource/document. The distances are temporal in the case of audio-visual resources. The temporal distance for audio-visual content is specified by time values in seconds, or by the number of scene changes that occur between two key-phrases. The temporal or spatial distances in the resource are combined with the spatial distance on the knowledge map and the metric that determines how close two key-phrases are in meaning to assign a final weight to the semantic distance between two-key-phrases.

The Visual Summary Generation algorithm uses the data determined by the Relation Extraction algorithm and the key-phrase extraction algorithms to determine the placement of the key-phrases on a knowledge map. The semantic distances between the key-phrases are used to cluster the key-phrases together. These appear as a cluster of nodes and links between the nodes on the knowledge map. Each cluster represents a visual summary of a section of the document. The section is defined by page, segment of time (for videos) and chapters and so on. The clusters are then combined to create the knowledge map which represents the visual and conceptual summary of the resource or topic. The key-phrases, relations, visual summaries of sections and the visual summary of the map are all made available to the user.

With respect to FIG. 2, the data storage and retrieval module 204 of the information collection, extraction and analysis module of the system is configured to communicate with the database 205, for storing and retrieving the plurality of key phrases and their respective weights and relations. The data storage and retrieval module is also configured to store and retrieve a plurality of relations and their respective scores. The data storage and retrieval module is also configured to store and retrieve automatically generated knowledge maps. The key-phrases, relations, images, concepts, and knowledge maps are stored and retrieved based on the user requirement.

The data presentation module of the system is configured to provide an interface for the user to create and personalize the knowledge map by using the information generated by the document parsing and analysis module and stored in the database. The module is configured to present the user with key-phrases, words, concepts, images and visual summaries extracted from the document parsing and analysis process. The data is presented to the user in synchronization with the presentation of the resource material to enable the online learner to quickly take notes and create the knowledge map easily and effortlessly. The keywords are highlighted with spoken text for video and audio resources, and presented separately or highlighted in the source material itself. This method of using audio in conjunction with spoken text improves the efficacy and the efficiency of the note taking process while improving recall and comprehension. The module enables the user to utilize all the data available in the database to effortlessly construct the audio-visual knowledge map.

Figure 3:
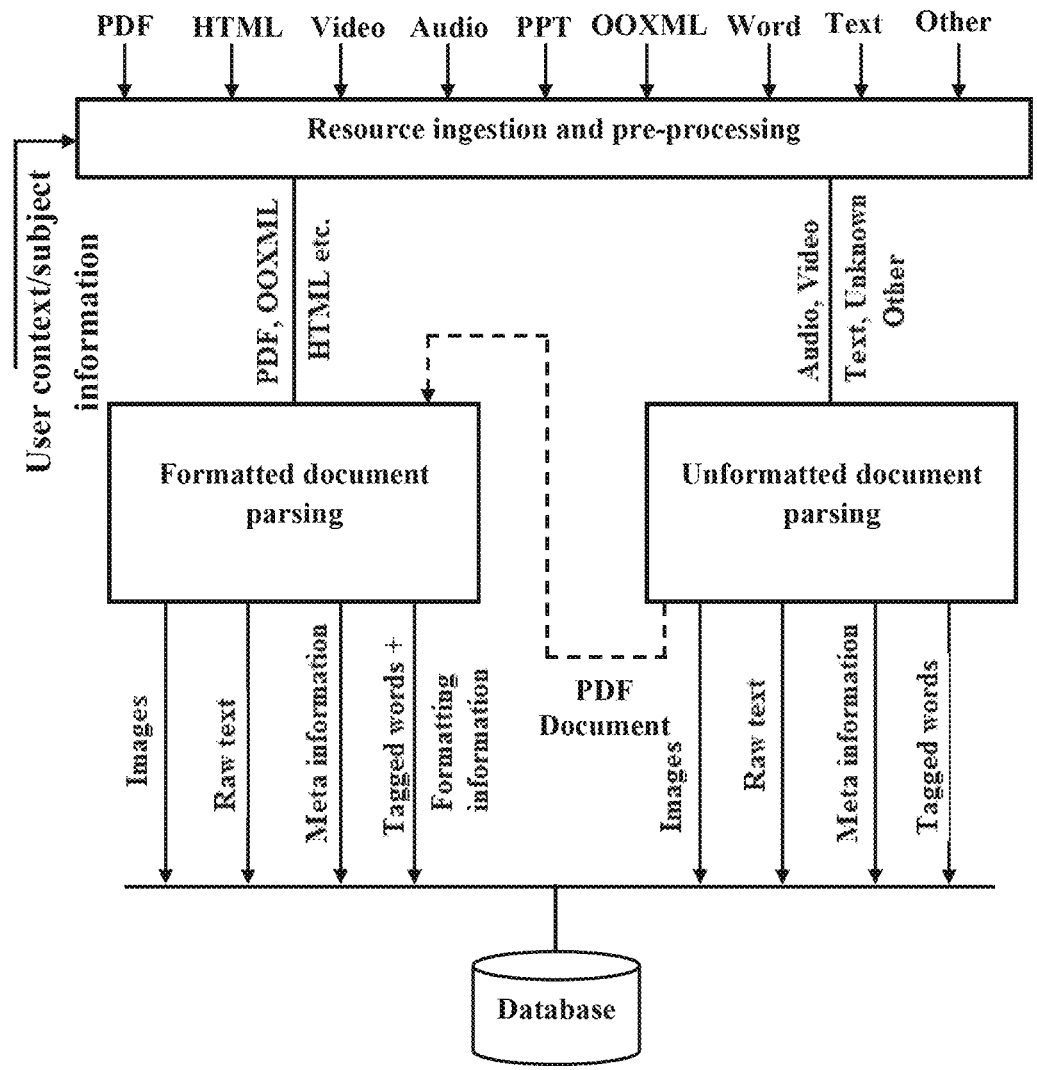
FIG. 3 illustrates a block diagram for a resource ingestion and parsing modules of the system, according to an embodiment herein.
Figure 4:
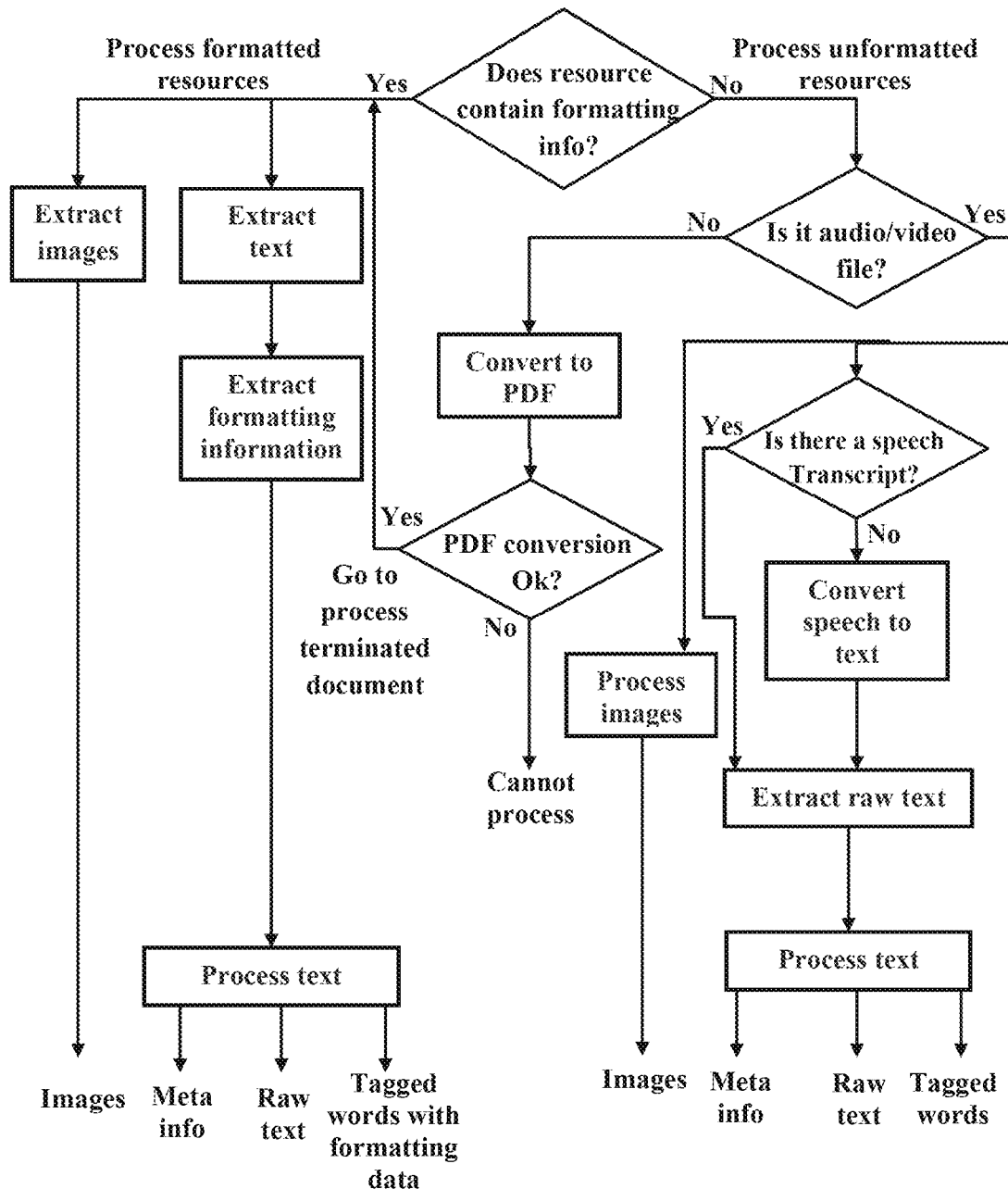
FIG. 4 illustrates a flow chart for explaining a method of parsing resources, according to an embodiment herein.

FIG. 3 illustrates a block diagram of a Parsing Module that is configured to automatically parse the resources. The Parsing Module parses the resources to extract raw text, embedded images, objects in an image, Meta information and tagged words. After removal of the stop words, each word in the document is tagged with formatting information, if any is available, and the position of the word in the resource. The position is specified by page number and row and column offsets for text resources and time offset for audio/video resources.

The Parsing Module checks if the resource is an audio or video file and then determines the availability of a speech transcript in a language supported by the Part-of-Speech Tagger. If a speech transcript exists for a supported language, the raw text is fetched and processed to provide the tagged words, raw text and metadata. If no speech transcript exists but the resource contains audio in a supported language, the system attempts to convert the speech to text and provides an unedited speech transcript that is used as the basis/base resource or document for extracting raw text and tagged words and metadata.

The Parsing Module further checks whether the resource is an already formatted document. If the resource is a formatted document such as a PowerPoint Presentation or a Microsoft Word document, the Parsing Module extracts and tags words with the formatting information in addition to tagging them with page number and row/column offsets.

The Parsing Module extracts the formatting information which includes information such as font family, font type and font style. If the word is part of a title or an itemized list, this information is also added to the set of tags associated with the word. The Font data is used further by the typographical/formatting analysis algorithm to determine the relative weights of the words in the resource based on their font information. For instance a key-phrase that appears in a section heading needs to be assigned a higher weight because the author of the resource is highlighting this by placing it in the section title. However this weight, although relevant within the context of the resource, is not necessarily highly relevant within the context of the topic or subject. The formatting analysis algorithm therefore uses the formatting weights in conjunction with the semantic weights that are extracted later in the process to arrive at a more accurate relative weights of the words in the resource and within the context of the topic to which the resource belongs.

The documents that have formats not recognized by the Parsing module are processed by attempting a conversion to PDF. If this process is found to be successful, the document is treated as a PDF document and parsed as such.

Figure 5:
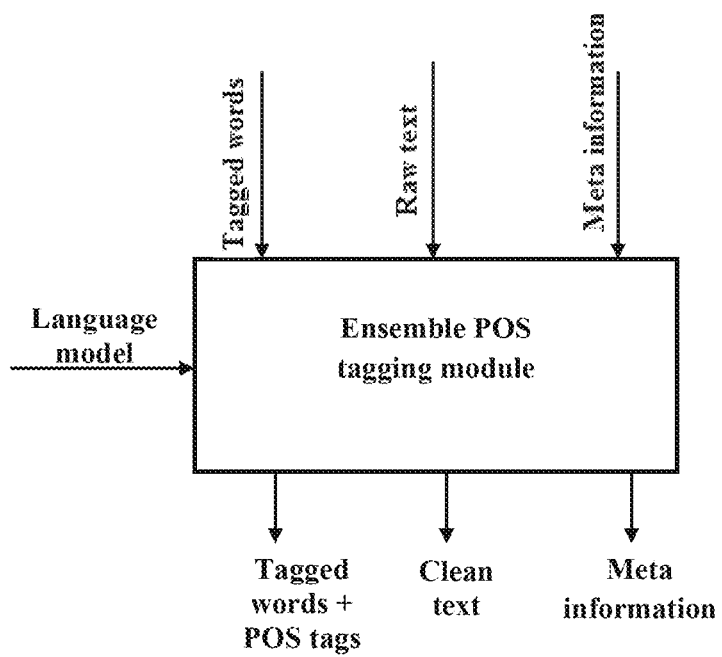
FIG. 5 illustrates a block diagram of the Part-of-speech tagging module of the system, according to an embodiment herein.

FIG. 5. Illustrates a block diagram of a POS Tagging Module. The POS Tagging module uses a plurality of POS tagging algorithms such as rule-based and statistical-based algorithms to assign Part-of-speech tags to each word (barring stop words) in the resource. If there is an ambiguity in the POS tags from the various algorithms used for POS tagging, or if the taggers are unable to tag the word, the algorithm attempts to resolve this by using an algorithm to guess the most likely POS. These words as well as words from other documents are added to a training corpus which is used to train the POS tagger models in order to improve their efficiency. Data from the document corpus is used in addition to the external resources such as Wikipedia. Further, it uses Penn Treebank and Brown Corpus POS tags to tag the words. At the end of the POS tagging, all the words in a document, except stop words, are assigned with position tags, formatting tags (if present) and POS tags. The document and the tagged set of words are now ready for semantic analysis.

Figure 6:
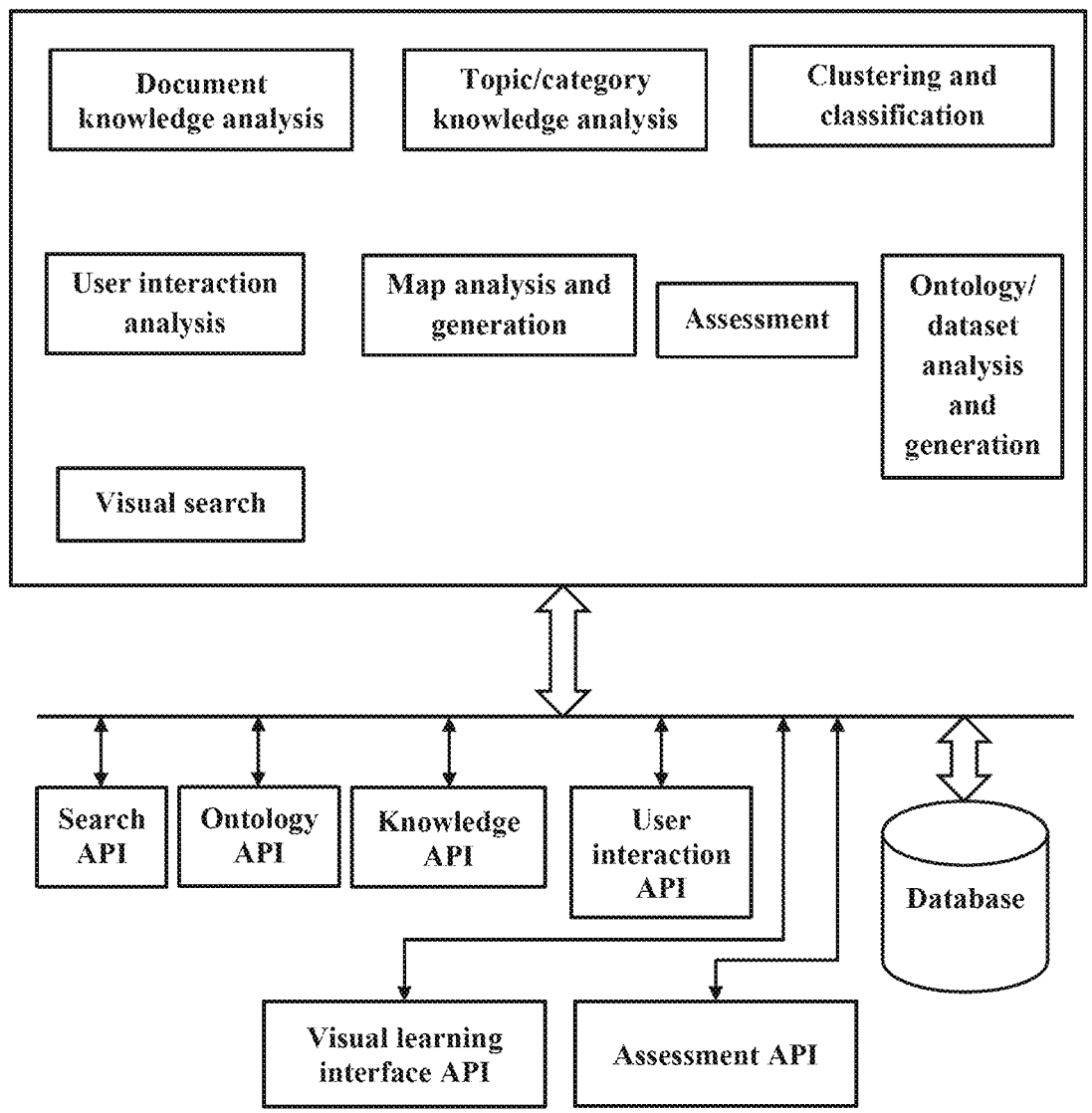
FIG. 6 illustrates a block diagram of the Knowledge Engine of the system, according to an embodiment herein.

FIG. 6 illustrates the block diagram of the Knowledge Engine that is configured to analyze a plurality of resources and a plurality of knowledge maps using a plurality of processing modules. The Knowledge Engine comprises the following modules: a Resource Knowledge Analysis Module, a Topic/Category Analysis Module, a Map generation and Analysis Module, An Ontology/Dataset Processing Module, a Visual Search Module, a User Interaction Analysis Module, and an Automatic Assessment Module. The Knowledge Engine further comprises Application Programming Interfaces (APIs) to interact with the plurality of modules and the database.

Figure 6A:
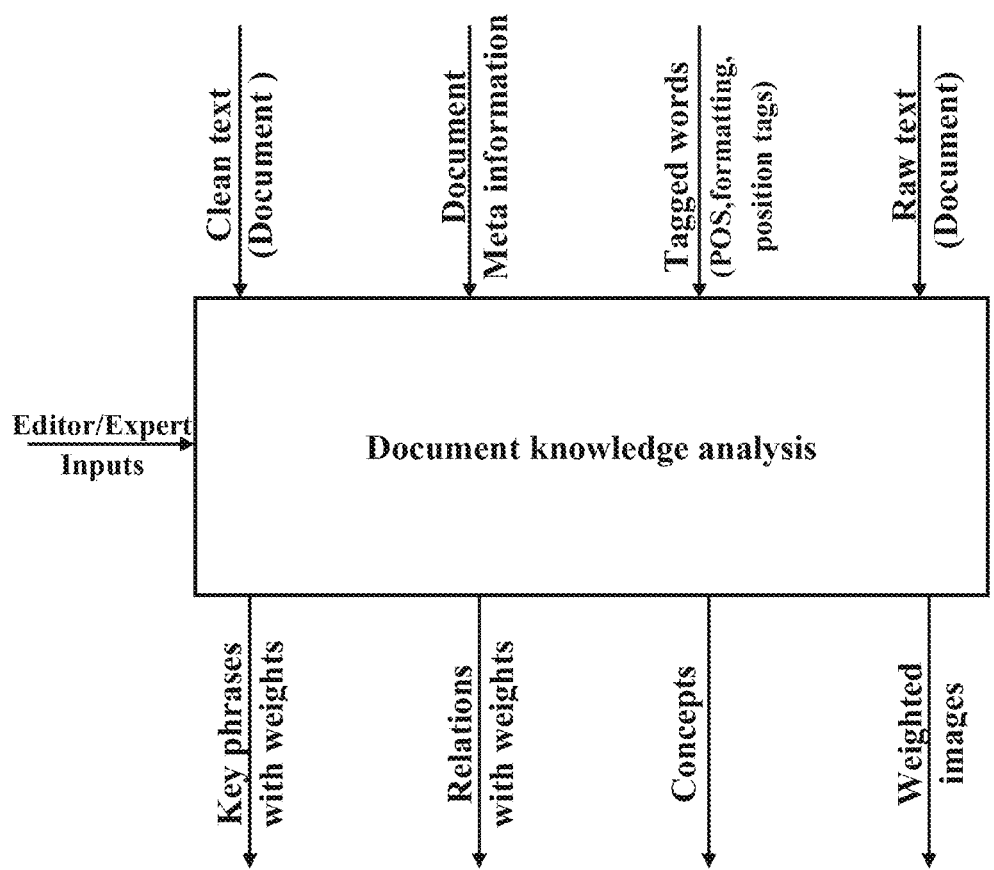
FIG. 6A illustrates a block diagram of a document knowledge analysis module in the Knowledge Engine of the system, according to an embodiment herein.

FIG. 6A illustrates a block diagram of a document knowledge analysis module in the Knowledge Engine of the system, according to an embodiment herein. With respect to FIG. 6A, the Resource Knowledge Analysis Module analyzes the content of a single resource to extract weighted key-phrases, images, relations and concepts using a plurality of algorithms. This data is used by the other modules to perform various analyses including Map analysis, topic/category analysis, ontology processing, assessment, and visual search.

Figure 6B:
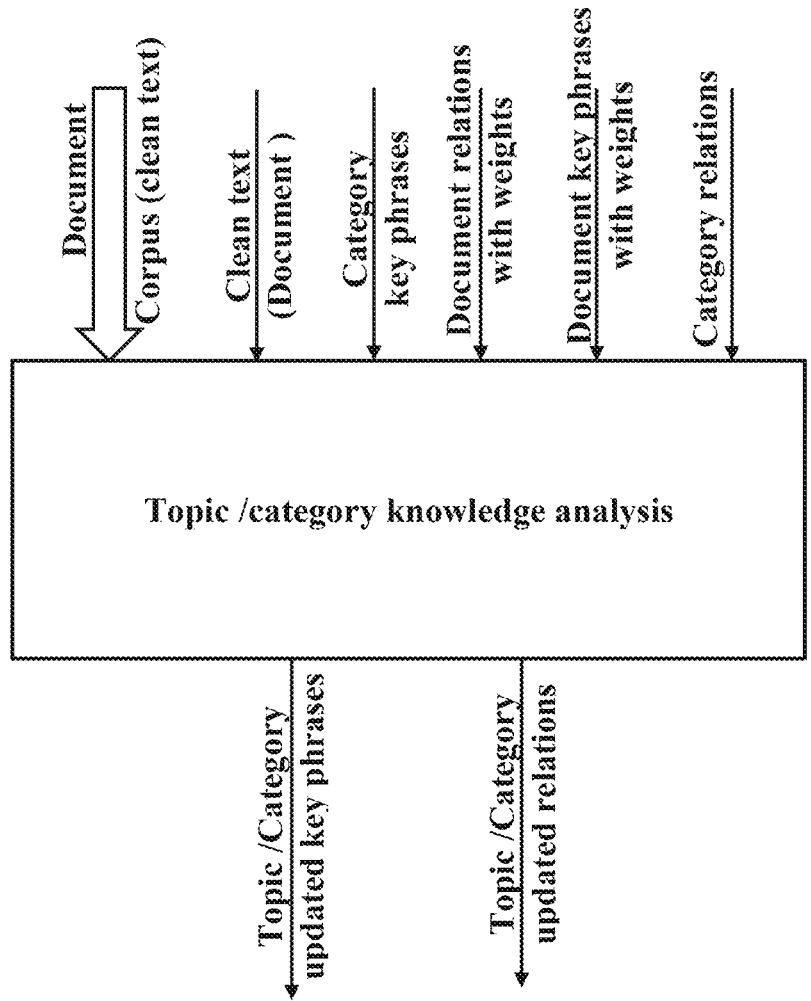
FIG. 6B illustrates a block diagram of a Topic/category knowledge analysis module in the Knowledge Engine of the system, according to an embodiment herein.

FIG. 6B illustrates a block diagram of a Topic/category knowledge analysis module in the Knowledge Engine of the system, according to an embodiment herein. With respect to FIG. 6B, the Topic/Category Knowledge Analysis module analyzes multiple documents belonging to the same category. For example, all documents belonging to the "Slavery" category are used for analysis to determine the weights of words with respect to the category "Slavery". The weights for the key-phrases are updated and applied across all documents that belong to the category. Relations are also examined, and their weights are updated to accurately represent their value within the context of the category.

Figure 6C:
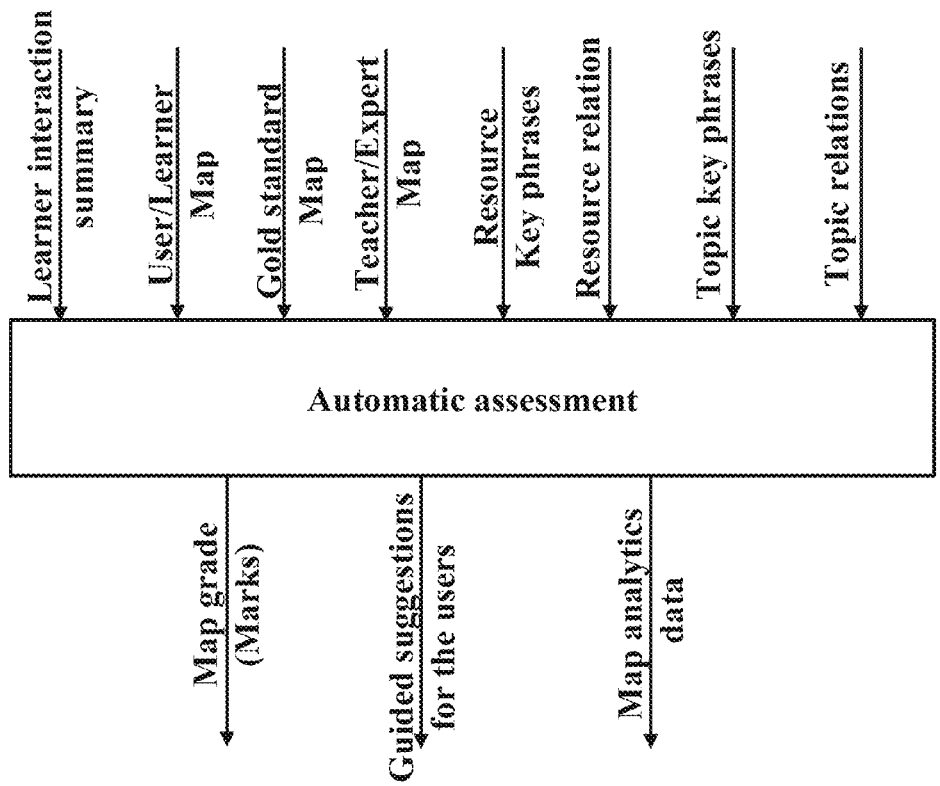
FIG. 6C illustrates a block diagram of an automatic assessment module in the Knowledge Engine of the system, according to an embodiment herein.

FIG. 6C illustrates a block diagram of an automatic assessment module in the Knowledge Engine of the system, according to an embodiment herein. With respect to FIG. 6C, the automatic assessment module uses automatically generated maps, key-phrases, and relations as well as manually created maps, key-phrases, and relations for directed learning and knowledge map based assessments. As users interact with maps, the data is fed back into the automatic assessment module to determine if the student is making the right connections; and to help guide the student towards making the right conceptual connections; to determine which portions of the academic resources are generating the most activity; and to assess the student through formal tests. Based on this information, the teachers determine the portions in the resource or topic, which requires specific focus in the classroom. The teacher further uses this information to check whether the resource needs to be re-designed by providing additional information such as the definitions of terms, or additional images, or additional material to help describe the content better.

Figure 6D:
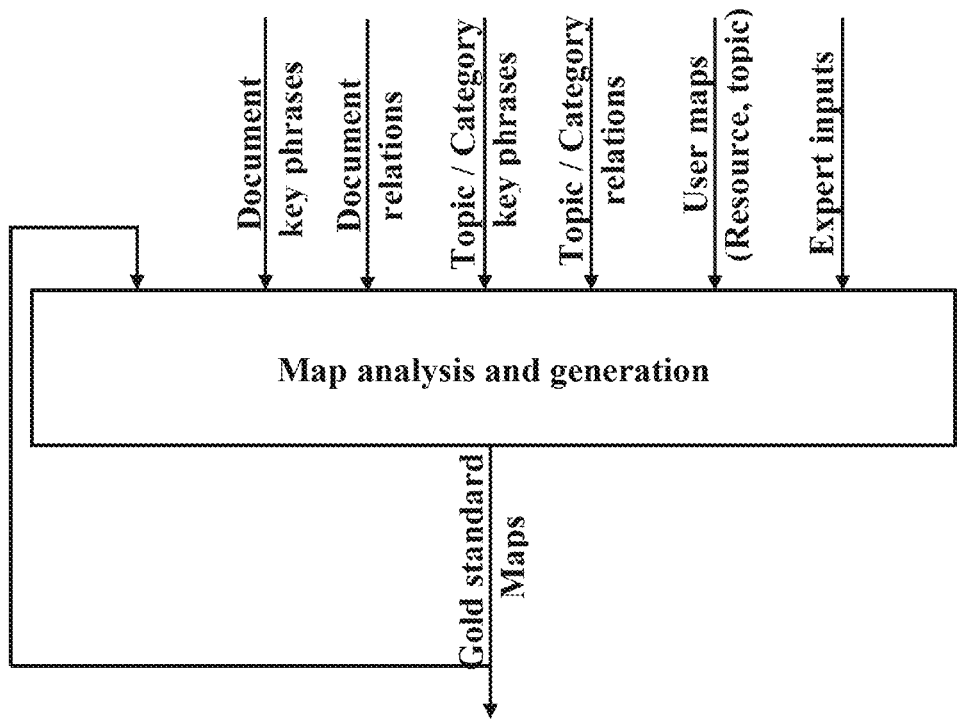
FIG. 6D illustrates a block diagram of a map analysis and generation module in the Knowledge Engine of the system, according to an embodiment herein.

FIG. 6D illustrates a block diagram of a map analysis and generation module in the Knowledge Engine of the system, according to an embodiment herein. With respect to FIG. 6D, the Map Analysis and Generation Module of the proposed platform is configured to automatically generate knowledge in the form of interactive audio-video notes. The relationship analysis module extracts pairs of key-phrases that are semantically connected by a linking phrase. For example: "red" "is a" "color". The phrase "is a" specifies the explicit relationship between the two phrases "red" and "color". The Map Generation algorithm creates a conceptual summary in the form of a knowledge map of the resource or topic using key-phrases and the extracted relations. A plurality of user maps are collected by the system and classified by resource subject, topic, and unit. Crowd-sourced user maps are analyzed by the Map Analysis algorithm to refine the automatically generated conceptual summary. Subject Matter Experts provide inputs to further refine the conceptual summary. As the number of maps increases, the conceptual summary evolves to a "gold" standard of the resource or topic and represents the knowledge contained in the resource or topic.

Figure 6E:
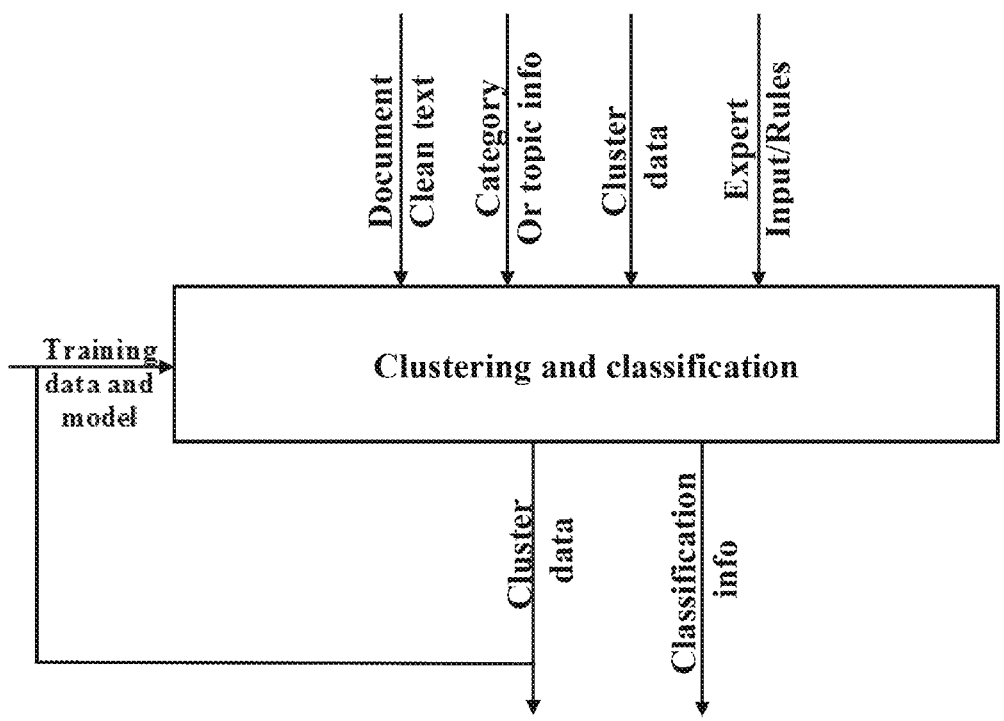
FIG. 6E illustrates a block diagram of a clustering and classification module in the Knowledge Engine of the system, according to an embodiment herein.

FIG. 6E illustrates a block diagram of a clustering and classification module in the Knowledge Engine of the system, according to an embodiment herein. With respect to FIG. 6E, the Clustering and Classification Module is used to categorize and classify educational resources by subject, topic, and unit. The semantic analysis engine works best if it has a-priori information about the subject, topic, and unit that the resource belongs to. For example, "US History", "Presidents", and "Abraham Lincoln" correspond to subject, topic and unit respectively. This enables the semantic analysis algorithm to assign relevant weights to words in the resource and/or topic to which the resource belongs. For instance, "Mary Todd", Abraham Lincoln's wife, has a higher weight in the context of US History but not as much in the context of World History. However, this information is not always available or even, if available, could be inaccurate. The Clustering and Classification algorithms first automatically places the document in the most appropriate cluster without using any category information. If category information is available it matches it with the automatically created category information. If a match exists, the resource is considered to be classified correctly. If there is no category information the resource is assigned to the automatically generated category. If there is a difference and the category has been provided by the content provider or user, it uses this information to train the clustering algorithm so that it can continuously learn as more documents are added to the platform.

Figure 6F:
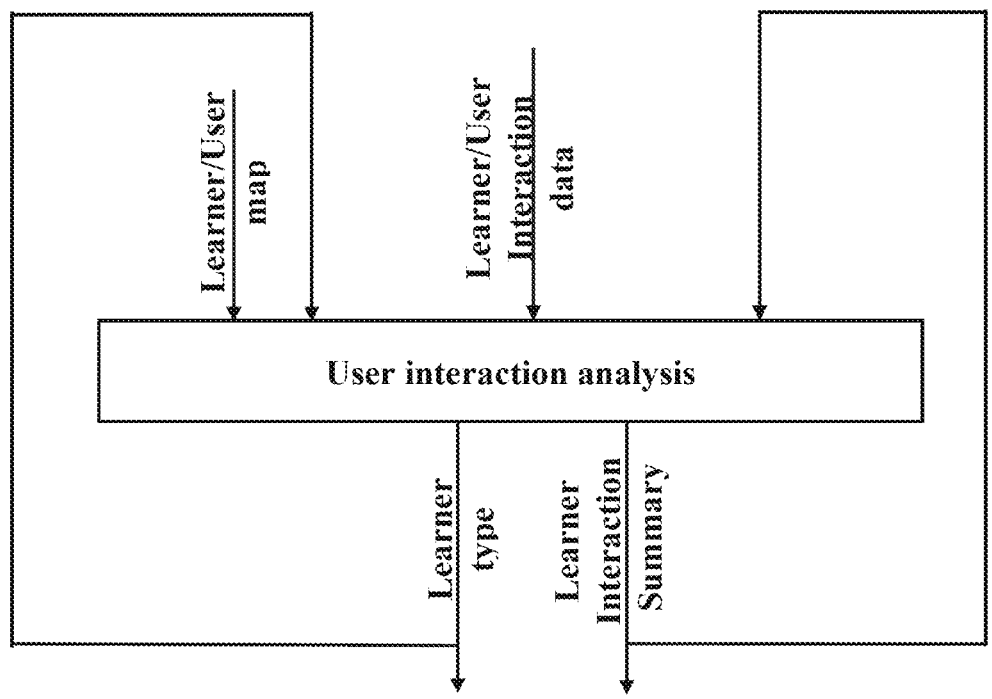
FIG. 6F illustrates a block diagram of a user interaction analysis module in the Knowledge Engine of the system, according to an embodiment herein.

FIG. 6F illustrates a block diagram of a user interaction analysis module in the Knowledge Engine of the system, according to an embodiment herein. With respect to FIG. 6F, the User Interaction Analysis Module analyses the interactions with the Visual Learning Environment or Interface while the student is in the process of creating a map. All user interactions such as zoom, scroll, create node, add text, take a snapshot are captured for analysis to determine the efficacy and efficiency of the interface, the learning type and style of the user, and so on. This data is gathered and saved with every session and associated with the map and the resources that are used to create the map.

Figure 6G:
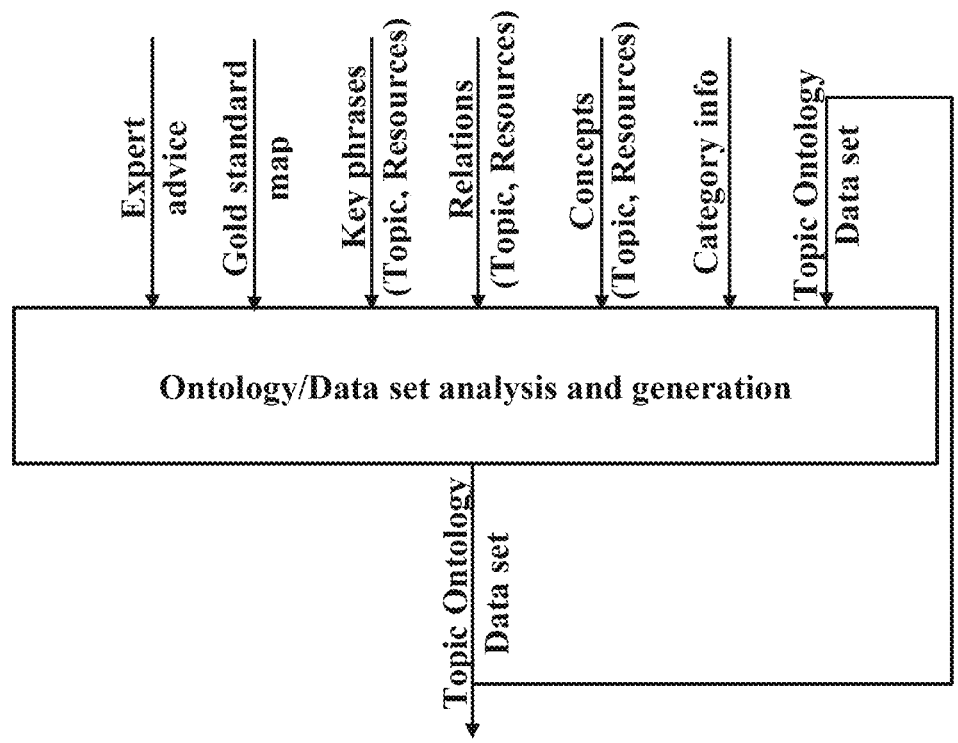
FIG. 6G illustrates a block diagram of an ontology/data set analysis and generation module in the Knowledge Engine of the system, according to an embodiment herein.

FIG. 6G illustrates a block diagram of an ontology/data set analysis and generation module in the Knowledge Engine of the system, according to an embodiment herein. With respect to FIG. 6G, the ontology/dataset processing module uses the data generated by the Resource and Topic/Category Analysis modules, the Map analysis modules, and domain expert inputs to generate an ontology/dataset for a specified category. For instance, if the category is "History", the datasets/ontologies are designed to include the geopolitical entities, events, event changes, etc., to map the data from the resource to the history ontology. The ontology is generated automatically and refined by user maps and expert inputs.

Figure 6H:
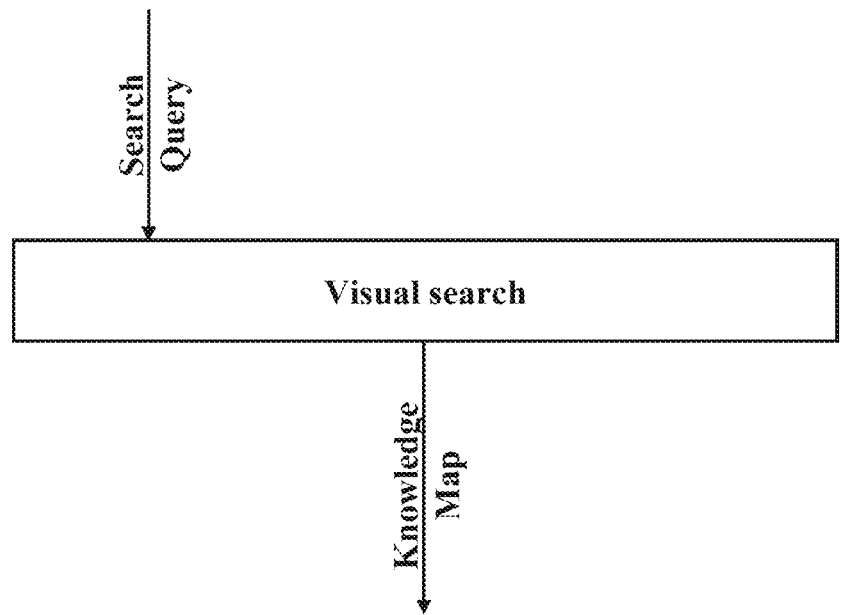
FIG. 6H illustrates a block diagram of a visual search module in the Knowledge Engine of the system, according to an embodiment herein.

FIG. 6H illustrates a block diagram of a visual search module in the Knowledge Engine of the system, according to an embodiment herein. With respect to FIG. 6H, the Visual search engine uses data from the analysis modules to determine the relevancy of a search phrase or phrases to a knowledge map or section of a knowledge map. It prepares a list of maps that are most likely to be relevant to the user and serves up a set of thumbnails and links back to the map. For instance, "Photosynthesis" leads to a list of maps for "Photosynthesis requires". "Photosynthesis chemical equation", and so on. The data presented to the user represents knowledge and how it is mapped within the context of the resource or topic. This facilitates faster and more relevant search where search for information is supplanted by search for knowledge.

Figure 7:
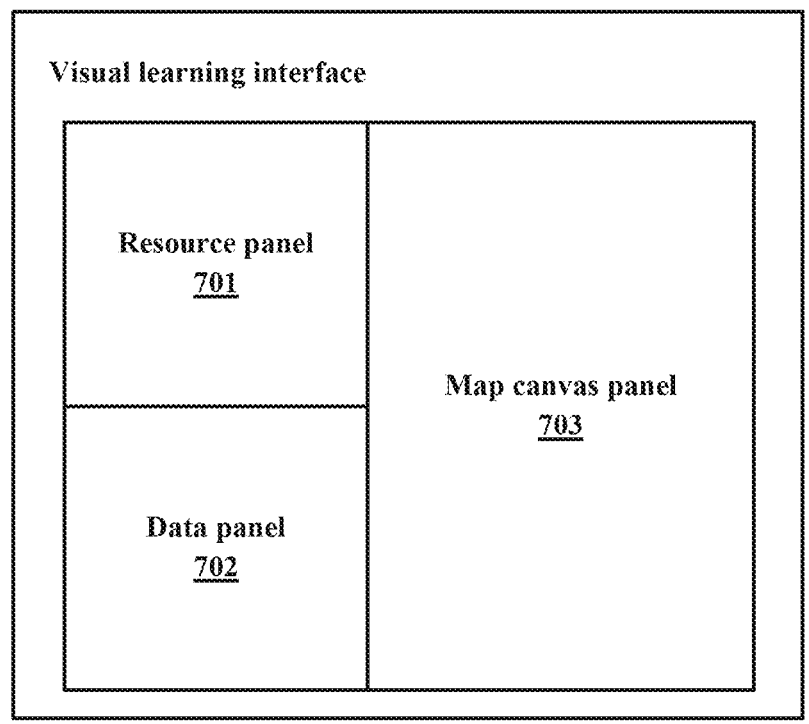
FIG. 7 illustrates the visual learning interface of the platform configured to use a plurality of online sources to create, present, organize, share and analyze knowledge on a subject matter in the form of interactive audio-visual notes in a single web or tablet based platform, according to an embodiment herein.

FIG. 7 illustrates a block diagram of a visual learning environment or interface configured to create and provide an interactive audio-visual notes in the form of knowledge maps and an audio-visual presentation as an interactive spatio-temporal map. The interactive audio-visual knowledge map comprises a plurality of nodes and a plurality of links connecting the plurality of nodes. The key-phrases, words and images extracted from the key-phrase extraction process are presented to the user in synchronization with the presentation of the source. For example, the key-phrases from a page or a segment of a page (a section, paragraph, chapter, and so on) or from a time segment (say 30 seconds) are displayed on the canvas in the data panel 302. In the case of video, the key-phrases are highlighted, when the word is spoken to emphasize its importance in the context of the sentence. In the case of static textual documents, the key-phrases are, optionally, highlighted in the document itself. The audio is synchronized with the highlighting process. As a consequence of adding additional cues or anchors in the form of audio and keyword highlighting, the users are able to improve recall and comprehension. The key-phrases are manually dragged and dropped onto the map by the user. Each key-phrase added to the map constitutes a node on the map canvas panel 303 of the layout. Each node carries all the tagged information obtained from parsing and key-phrase extraction process including the link-backs to the resource. When the play or bookmark icon associated with the node is pressed at any time, the resource viewer panel 301 locates the corresponding content using the information in the node and cues to the offset (time or page as the case may be) that is contained in the node. Nodes or key-phrases are manually linked by the user and these links optionally labeled to create implicit and explicit connections between the key-phrases that make up the knowledge map.

Figure 8:
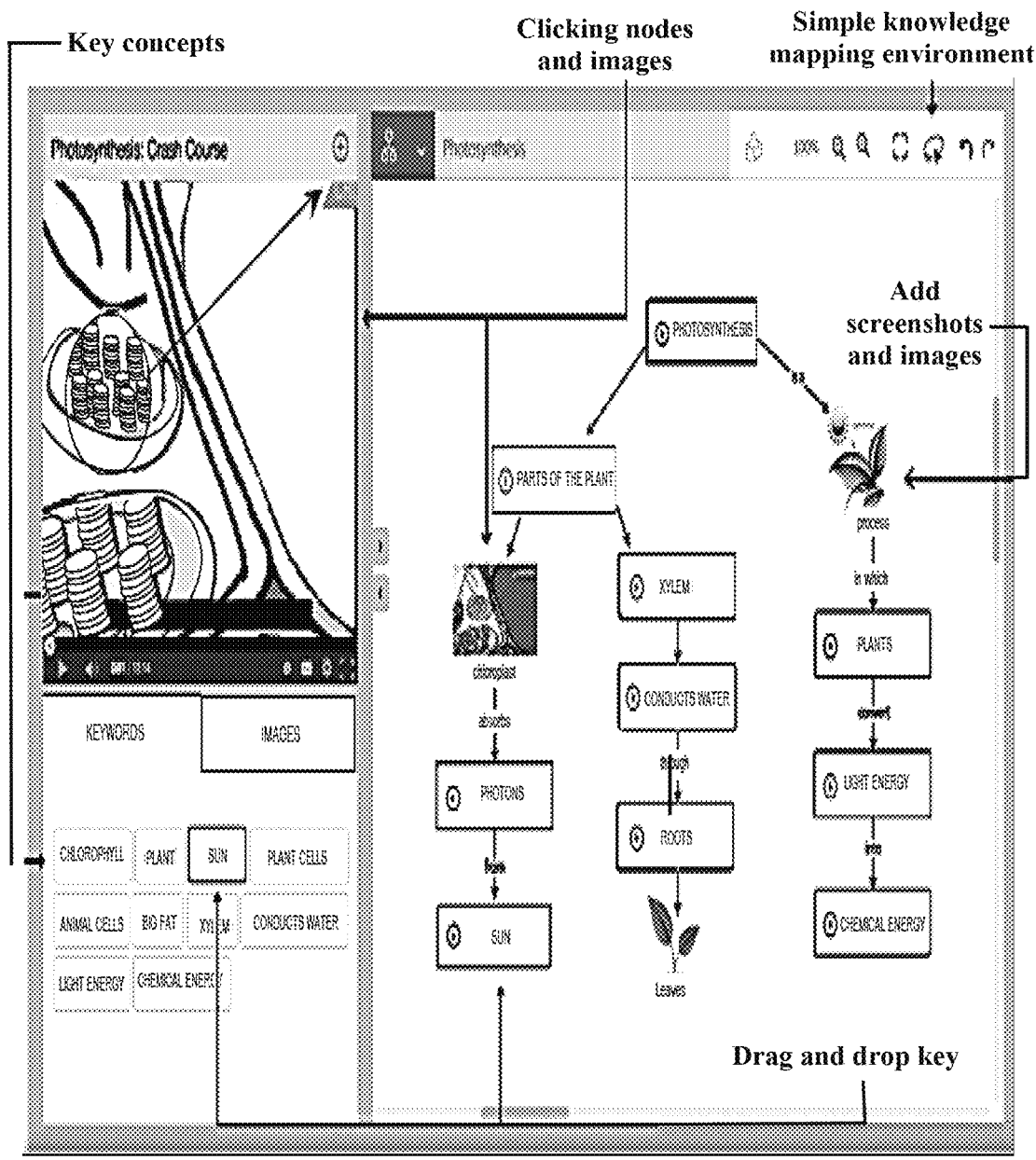
FIG. 8 is a screenshot of a single web or tablet based platform configured to use a plurality of online sources to create, present, organize, share and analyze knowledge in the form of interactive audio-visual notes, according to an embodiment of herein.

FIG. 8 illustrates a screenshot of the proposed platform configured to provide an interactive audio-visual notes in the form of knowledge maps, an audio-visual presentation as an interactive spatio-temporal map, and a maps and knowledge analysis system using multiple online resources, according to an embodiment herein. A plurality of explicit connections is made between the key-phrases. The user is also allowed to drag the relevant images and key-phrases onto the map. Each phrase or snapshot is linked directly back to the exact point in time at which the key-phrases appear in the source material, thereby providing an interactive and conceptually linked set of visual notes that is ready for a pre-test review. The user drags and drops the required key phrases onto the map canvas panel and creates the nodes. Each node carries the tagged information obtained from the parsing and key phrase extraction process, which includes the link-backs to the resource. A "play" or "bookmark" icon is located on the node to indicate that the node contains the link-back option. When the play icon is pressed at any time, the resource viewer panel locates the corresponding content using the information in the node and cues to the offset time or page (as the case may be) from which the key-phrase was extracted. The corresponding page or frame is then displayed. Optionally, the user selects to cue to a point before the actual phrase appears in the resource so as to establish some context for the key-phrase contained in the node. The nodes from the multiple resources of varying formats are placed on the map and the link-back information is used to serve up the correct viewer such as PDF, MP4 player etc., at the correct offset. This feature allows the user to seamlessly and instantly move between the notes and resources. Therefore, an interactive set of notes are culled from the various resources used to create a knowledge map.

The relation between the nodes on the map is defined by a physical distance between the nodes, the text contained in each node, a linking phrase that links the node when they are directly connected, and a semantic distance between the nodes. The physical distance between nodes depends on the number of links that physically separate the two nodes on the map. One node is connected to another node by the plurality of links and nodes. The connection comprises two types. One is a direct connection that provides a single link between the two nodes and the other is an indirect connection that comprises one or more links and nodes between the two nodes. The linking connection determines or estimates the spatial or physical distance between the nodes. The linking phrase between the two nodes explicitly specifies the nature of the relation between the two nodes. This explicit relationship is specified for nodes that are directly linked to each other. For example, the nodes "red" and "color" are connected by the linking phrase "is a". The semantic distance by two nodes is also measured by a similarity in meaning between the textual contents of the nodes. The semantic distance between two nodes is a calculated entity to determine or estimate the similarity between the text contained within one node and the text contained in another node. The semantic distance between the text contained within one node and the text contained in another node is also measured by their spatial distance within the resource from which they were extracted. The semantic similarity will vary with respect to the context. For example, the map about emotion containing the words "angry" and "red" could indicate that the two words are closely related. However, the same words appearing in a story which has a man in a red shirt who is angry about something would not exhibit the same semantic similarity.

The notion of semantic and physical closeness is extended across the multiple maps by imagining a large virtual map comprising a plurality of interconnected knowledge maps. The semantic distance therefore comprises two parts. The two parts are the intra-map distance and the inter-nap distance. The underlying assumption is that in either case, the maps belong to the same topic or subject.

The maps are also tagged with a plurality of skill levels based on the user's profile and a plurality of social network metrics. The plurality of social network metrics includes the number of times the map or portions of the map are used in other maps. This is analogous to citations or references. Another metric is the number of times it is viewed. Yet another metric is the number of "likes" a map has received and the like. The values for the plurality of social network metrics are used to update the values of the semantic distances that are calculated using intra-document and inter-document analysis. The data from the publicly available data-sets and on-line dictionaries such as DBPedia, FOAF, OpenCyc, and Ontobee are used to validate and/or modify the relations and the values that quantify the semantic nature of these relations. Each text phrase and image is tagged with the semantic distance weight along with the linking phrases. The weights of relations are also determined and stored. These weights are constantly updated as maps and resources are added to the server.

The automatic assessment module of the system is configured to determine/estimate a student's conceptual understanding of a topic in comparison with a teacher's or a "standard" knowledge map of the topic. The assessment module automatically analyzes and examines the conceptual connections made by the student while taking the notes in the form of audio-visual maps and compares these connections with the reference connections the student is expected to make. This information is used to predict how well a student will do in a quiz before they actually take a test. A plurality of factors is taken into account while evaluating the maps created by the student. The plurality of factors comprises the text phrases used in the nodes, the linking phrases between nodes, how the nodes are physically connected to each other, the semantic distance between expected and actual text phrases, the layout of the nodes (which could be hierarchical, cause-and-effect etc.), the use of prior knowledge, and other factors.

The assessment module adopts at least two types of analysis methods for evaluating the maps created by the student. The two analysis methods are Template Based Analysis and Statistical/Heuristic Analysis.

The template based analysis is the simplest method adopted for the automatic assessment of student maps. In the template based analysis method, the teacher creates a map using one or more resources and the created map is used as a template. The teacher uses the template to create various assessment exercises that are designed to determine how well a student grasps the concepts and constructs the knowledge maps. The students construct maps on the platform while consuming the resource and the construction is analyzed automatically using direct comparison or statistical or semantic comparison. The comparison of the student map with the teacher's template is used as a feedback mechanism for the teacher. For example, in a flipped classroom, the teacher assigns a resource for knowledge mapping by the students. The maps are analyzed by the platform which provides an analytical summary of how well the students are in grasping concepts and making connections and highlights areas that need to be explored further in a subsequent class. The teacher is able to focus on explaining the concepts that seem to be difficult and in certain cases, go back and rewrite or re-record the resource to explain the concepts differently or provide additional background material. The platform provides a means for the teacher to use a template or reference map to create a visual fill-in-the-blanks assessment. Text or images are removed from one or more nodes and/or from the links on the reference map and the student is asked to enter the correct phrase or place the correct image in the appropriate place on the map. The phrases are supplied along with the map or the student is allowed to use their own words. The images are always supplied for the student to place in the correct position on the map. These and other methods are used to assess a student's grasp of knowledge. In the case where students enter their own words, semantic distances from the expected and actual answers are compared to rate the solution. Further, the teacher is able to remove portions of the map for the student to complete without any provided assistance. These maps are called starter maps and are used by the student to add his/her own notes to personalize and create their own knowledge maps.

The statistical analysis provided by the assessment module adopts the "gold" standard template to automatically assess the student maps. As the number of maps that are created for a specific resource grows, the data presentation module analyzes the resource data statistically and semantically to create a "gold" standard for the resource or topic. The "gold" standard is considered to be a best fit visual summary of the resource or topic. In the aforementioned scenario, the module is enabled to use the "gold" standard instead of a teacher provided template as a reference for assessment.

The system adopts Meta guiding for audio and video resources. Meta guiding is the visual guiding of the eye to a piece of text. The key-phrase that is contained in the speech is highlighted in the data panel when that phrase is spoken. The highlighting uses a visual feedback in synchronization with the spoken form of the word to reinforce the importance of the word in the context of the sentence. The meta-guiding is implemented by adopting two approaches/techniques. In the first approach/technique, the entire speech transcript is displayed and the key-phrase highlighted as the user consumes a resource. In the second approach/technique, only the key-phrase is highlighted (all the key-phrases are present in a scrolling data panel), when the phrase is heard. The key-phrase is then dragged and dropped onto the map panel where the user makes connections between the concepts and constructs knowledge. The combined application of a visual meta guiding methodology with an auditory input and the kinesthetic creation of a set of notes on the knowledge map increases comprehension and makes the process of taking notes on our platform highly effective.

Figure 9:
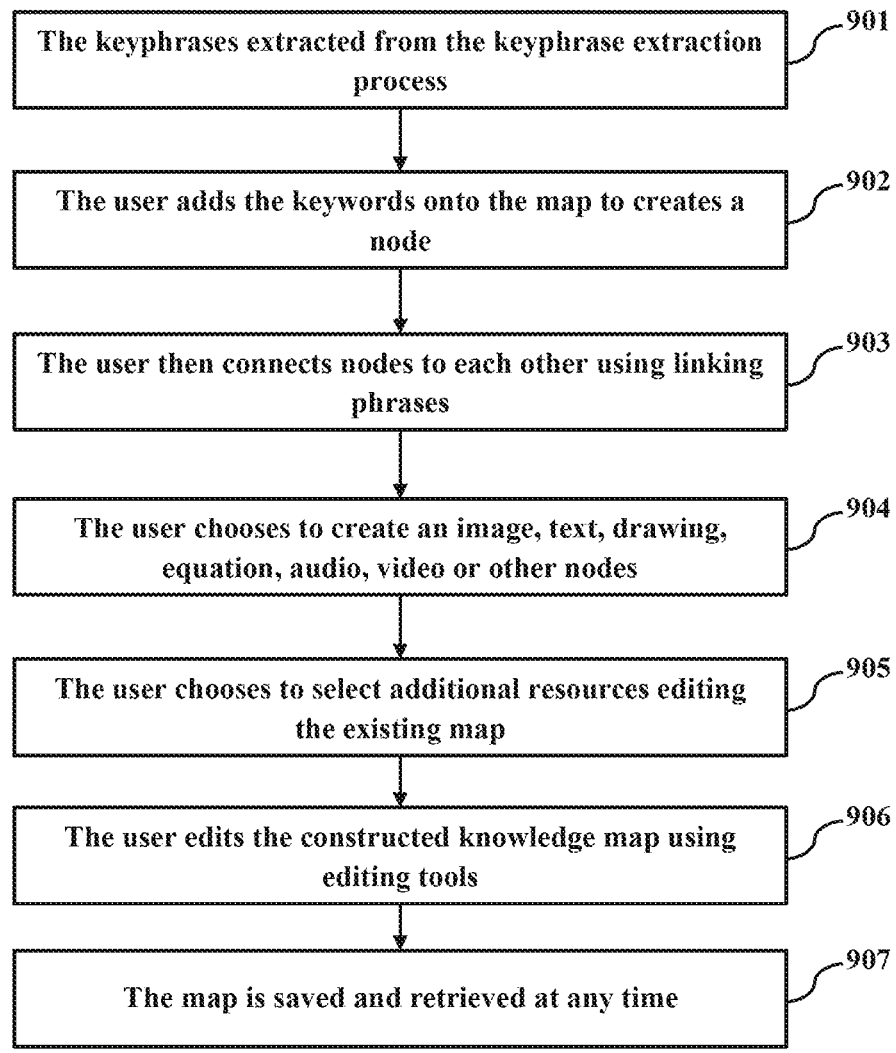
FIG. 9 illustrates a flowchart explaining the process steps involved in the method for creating an audio-visual map, according to an embodiment herein.

FIG. 9 illustrates a flowchart explaining the steps involved in the method for creating an audio-visual map, according to an embodiment herein. The method for creating an interactive audio visual map comprises the following steps. The key-phrases, words, and images extracted from the key-phrase extraction process are presented to the user in synchronization with the presentation of the source (901). The user drags and drops the extracted keywords onto the map canvas, or map panel. The key-phrase is added to create a node (902). The user creates several nodes by dragging the key-phrases onto the map. The node that contains the key-phrase is edited based on a user requirement. Only the text will be modified. Any of the tagged data that is associated with the node is retained. The user then connects the nodes to each other using the linking phrases (903). For example, when the two nodes "photosynthesis" and "water" are present on the map, the user connects "photosynthesis" to "water" with the linking phrase "requires" or "needs". The process adds semantic information to each of the nodes and a relationship is clearly established between the two. The user is allowed to convert the nodes from text to speech and have the speech played back during a review mode. The user is allowed to create his/her own nodes with text of his/her choice. The user is allowed to create an audio node instead of an image node or text node and the audio note is played when the "play" icon is pressed (904). The user is allowed to create a video node to play an external video, when the "play" button is pressed. The user is further enabled to create an image node to represent the concept with an image instead of text or use a combination of image and text on the node. The user is allowed to use an equation node to enter mathematical equations. The user is allowed to use a snapshot node which is a screenshot of the video for video resources or a page if the resource is a textual document. The user is allowed to use a drawing node to draw pictures on the node. The user continues to consume the resource being presented with other data in synchronization with the presented resource. The user creates nodes and edits the existing nodes until the entire resource is consumed. The user is allowed to select other resources for viewing and uses the data associated with these resources to add to the existing map (905). The user edits the constructed knowledge map using the editing tools that include options to change the colors of the nodes, to move and delete nodes, to change a linking line style and so on (906). The map is saved and retrieved at any time (907).

Figure 10:
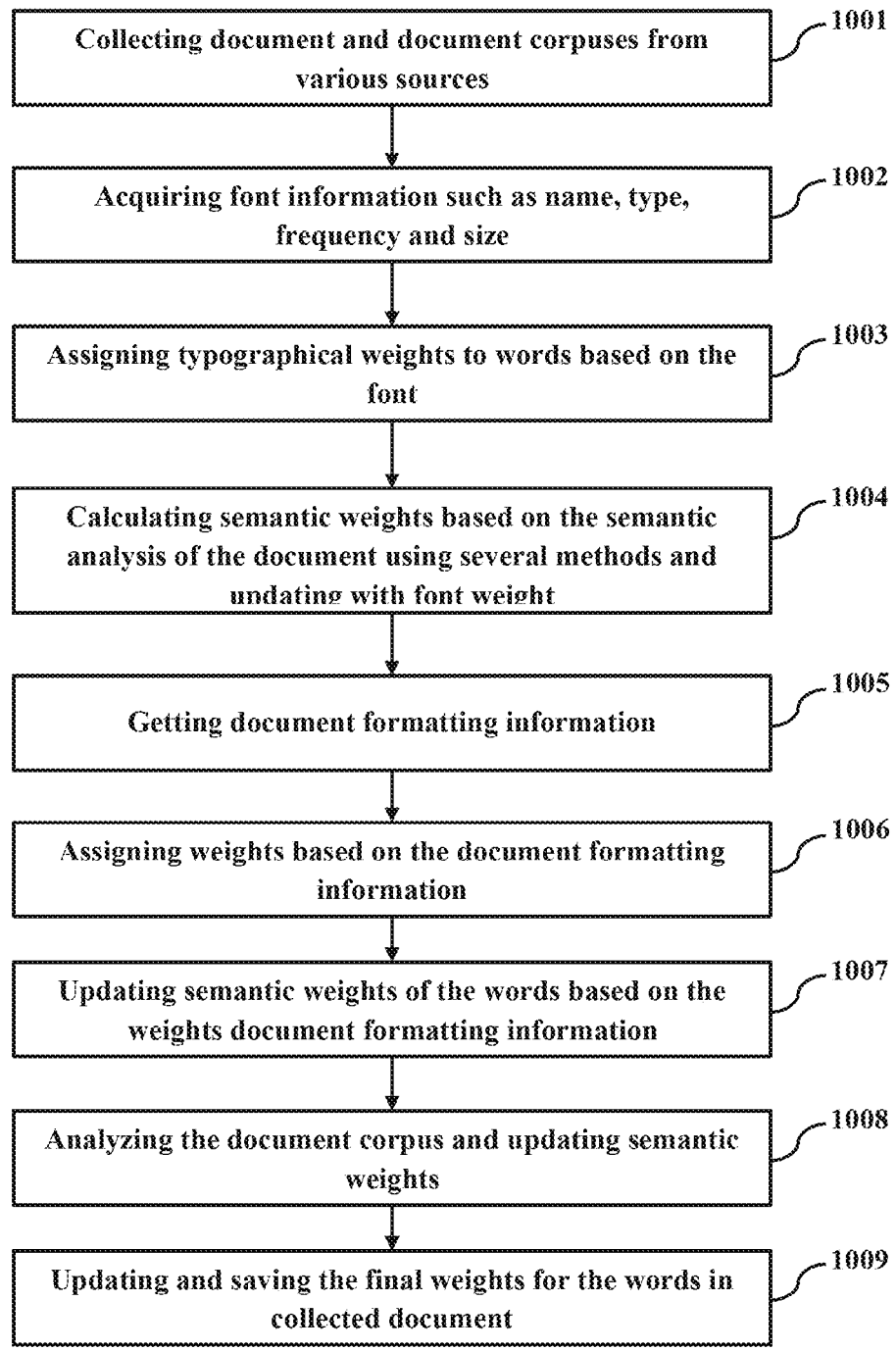
FIG. 10 illustrates a flowchart explaining the process steps involved in the method for collecting documents from various sources and extracting information/content from the collected documents, according to an embodiment herein.

FIG. 10 illustrates a flowchart explaining the steps involved in the method for collecting documents from various sources and extracting information/content from the collected documents, according to an embodiment herein. The method comprises the following steps. The documents are collected from various sources and a document corpus is created (1001). The font information such as name, type, style and size are acquired (1002). The typographical weights are assigned to the words based on the font information (1003). The semantic weights are calculated based on the semantic analysis of the document using various methods and updated with font weights (1004). The document formatting information such as headers, numbered lists, etc., is acquired or collected (1005). The weights are assigned based on the document formatting information (1006). The semantic weights of the words are updated based on the weights assigned to the document formatting information (1007). The document corpus is analyzed and semantic weights are updated based on this information (1008). The final weights for the words in collected documents are updated and saved (1009).

Figure 11:
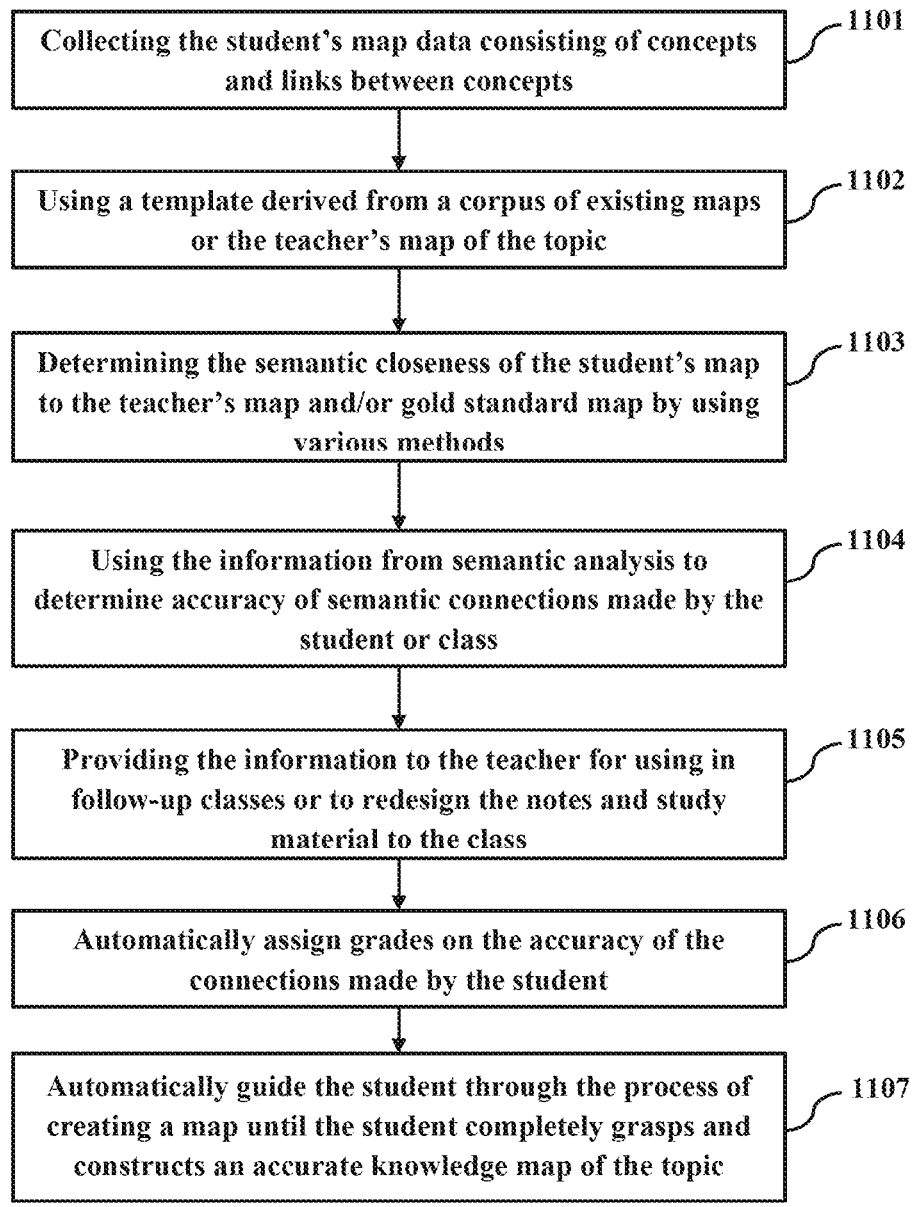
FIG. 11 illustrates a flowchart explaining the process steps involved in the method for analyzing conceptual connections in a visual map for providing automated assessment of the constructed map, according to an embodiment herein.

FIG. 11 illustrates a flowchart explaining the steps involved in the method for analyzing conceptual connections in a visual map for providing automated assessment of the constructed map, according to an embodiment herein. The method for analyzing the conceptual connections in a visual map comprises the following steps. The student's map data consisting of the concepts and the links between the concepts is collected (1101). A corpus derived from the existing maps of the topic or the teacher's map of the topic is used (1102). The map generated automatically by the Map Analysis and Generation module of the Knowledge engine is called the "gold standard" map for the resource or for the topic as the case may be. The semantic closeness of the student's map is determined using the teachers map and/or the gold standard by using template-based methods, statistical methods and other methods (1103). The information from semantic analysis is used to determine the accuracy of the semantic connections made by the student or the class. (1104). The information is provided to the teacher so that the teacher is enabled, in a follow-up class, to focus on the sections that caused the most problems for students. The teacher is also enabled to redesign or re-present his/her notes and study material to the class focusing, again, on the material that seems to be poorly understood by the students (1105). The grades are assigned automatically based on the accuracy of the connections made by the student (1106). The student is automatically guided through the process of creating a map until he/she completely grasps and constructs an accurate knowledge map of the topic (1107). The assessment module analyzes and compares the conceptual connections made by the student while he or she is taking notes using the platform. This information enables the teacher or the student to determine or evaluate a conceptual understanding of a topic. The teacher has access to visual data, that is the map, as well as to statistical and analytical data to determine how well a student or a class learns without a need for conducting a quiz.

Figure 12:
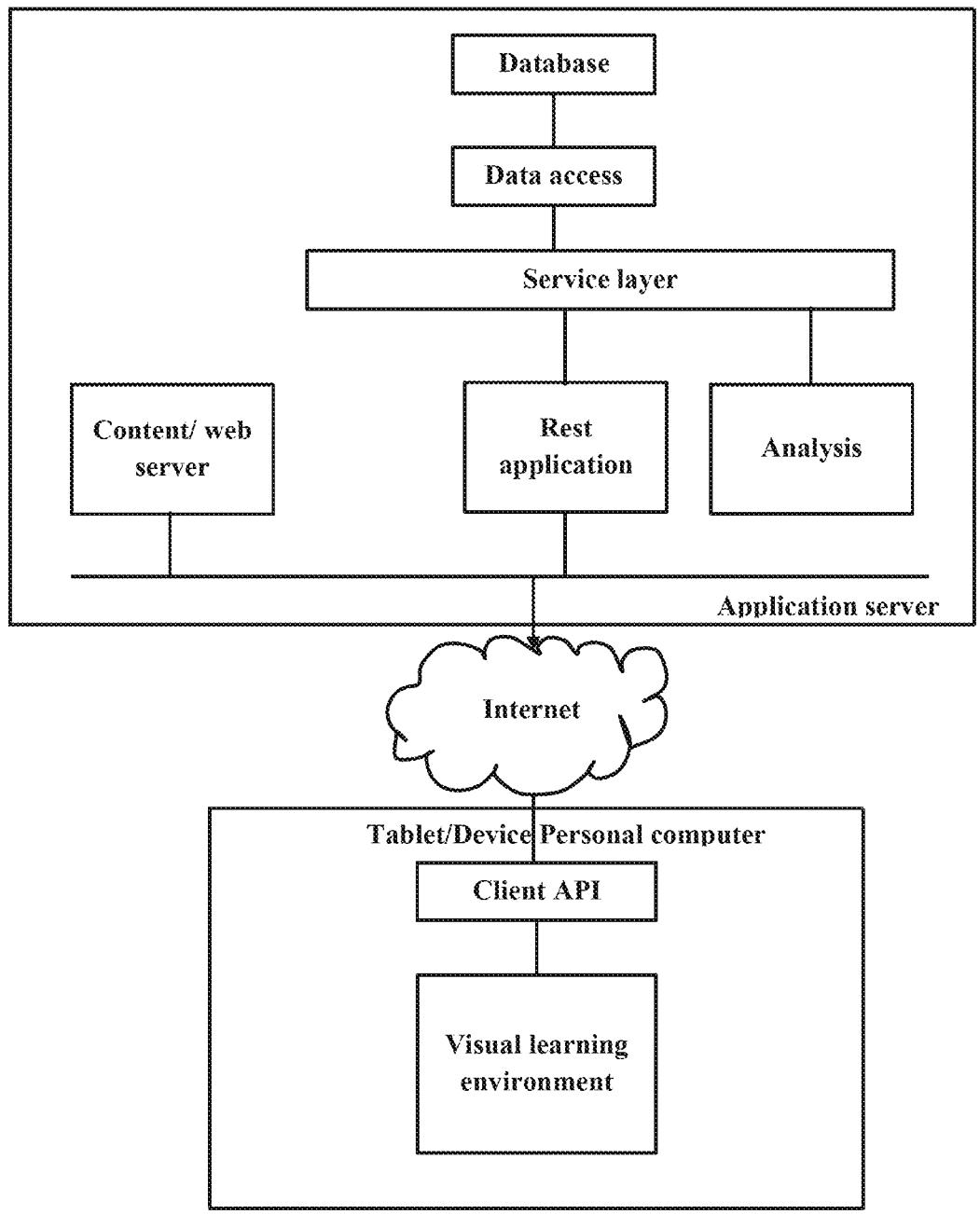
FIG. 12 illustrates a block diagram of a system for creating, presenting, organizing, sharing and analyzing knowledge on a subject matter in the form of interactive audio-visual notes in a single web or tablet based platform, according to an embodiment herein.

FIG. 12 illustrates a block diagram of a system for creating, presenting, organizing, sharing and analyzing knowledge on a subject matter in the form of interactive audio-visual notes in a single web or tablet based platform, according to an embodiment herein. With respect to FIG. 12, the Visual Learning Solution uses a client side solution and an application server. The client side solution comprises a client API that runs on a Tablet, or personal computing device such as a Notebook or laptop. The client side solution is used to communicate with the application server to send and receive data and commands. The client side solution further includes a visual learning environment that is used by learners to add resources to the application server to create knowledge maps in the form of interactive audio-visual notes and to share and discover knowledge maps.

The server side solution comprises of a REST application that communicates with multiple clients, an analysis module that handles resource ingestion and analysis, and a content/web server. The REST application and the analysis module use a service layer for data and command communication and a data access layer to store and retrieve data.

The platform is also used for helping the patients with cognitive disorders such as Alzheimer's to retrain their brain and to delay the onset of the disease using methods that create knowledge pathways that replace pathways that have been affected by the disorder. Using audio, video, images, color and text, the platform creates narratives that are derived from the patient's own experiences, events, memories and people known to the patient. The platform varies the narrative option by removing or modifying the elements of the narrative. For instance, the visual element (say an image) is removed, or the color or font of a text phrase is changed. These narratives are interactive and force the patient to do, say, feel, touch, or imagine something while interacting with the narrative. A set of exercises are developed and used in conjunction with olfactory, gustatory, and somato-sensory stimuli and other approaches to retrain the brain.

The platform is used as a virtual desktop to replace the current look and feel of the current desktops. The knowledge map in this case is an interactive organizational interface to educational, personal, or business material. The users upload the resources including applications to the system. The system automatically determines or detects whether the uploaded resource is a document, an audio resource, or video resource, or application. The system tags and stores the uploaded resource on the computer (or cloud). Optionally, the uploaded resource is analyzed to extract a meaningful information that is either presented to the user or to another application that can make sense of, and use the data. For instance, an uploaded financial statement is used to extract balances and credit/debit entries and the information is either categorized and displayed under the "Finance" category or passed along to a money manager application. Each document becomes a node on the map and is placed automatically or manually in its appropriate category. To extend the example, the financial statement would be placed under finance→year→month. Other nodes could include links to email, video and audio files. In each case, a clicking operation on the node opens up the appropriate viewer or application for the node. The idea is to abstract completely the notion of files and folders and move to a paradigm which uses tags and semantic data associated with the resource to categorize, query, and interact with these resources all within a conceptual and visual framework of the platform.

The platform is used to flatten education by providing conceptual summaries in the form of knowledge maps available to students in multiple languages. The student is quickly able to comprehend the key concepts in a resource in his or her own native language. The user is able to switch between maps in different languages and use that as a basis for learning a different language.

The platform is available in a social network platform where multiple users are allowed to create, share and collaborate using knowledge maps. The users generate personalized maps based on knowledge constructed by other users. Each knowledge map, or visual summary, that is added to the platform helps to update and refine the accuracy of the semantic data.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A computer implemented method comprising instructions stored on a non-transitory storage medium and run on a hardware processor in a computing device for creating, presenting, sharing, organizing and analyzing knowledge on a subject matter through a plurality of algorithms, the method comprises the steps of:

collecting a plurality of resources or documents related to a particular topic from a user or content provider and extracting a key information related to the particular topic from the plurality of resources or documents through a Resource Injection and Preprocessing module loaded on the computing device, and wherein a raw text, a plurality of words tagged with position information and a plurality of images in the plurality of resources or documents are extracted along with a metadata about the plurality of words tagged with position information and a plurality of images in a resource or document are extracted along with a metadata about the plurality of resources or documents;

parsing the resource or document to extract and tag all words in the resource or document through a parsing module loaded on the computing device using an algorithm, and wherein the extracted words are tagged with a position information and a formation information;

clarifying and tagging the words extracted with the parsing module into parts of speech through a Part-of-Speech (POS) tagging module loaded on the computing device using an algorithm, based on a combination of a rule based on a combination of a rule based algorithm and a stochastic based algorithm;

automatically generating a knowledge map with a Knowledge engine loaded on the computing device through an algorithm;

collecting a plurality of user generated knowledge maps created with the extracted words and images through a visual learning interface and data presentation module loaded on the computing device using an algorithm, and wherein the plurality of user generated knowledge maps are audio-visual knowledge maps, and wherein the plurality of user generated knowledge maps comprises a text, an image, a mathematical equation, a drawing, an audio note and a video note notes/nodes;

receiving a plurality of knowledge maps created by experts on a subject matter with the visual learning interface and data presentation module using an algorithm;

combining the automatically generated knowledge map with the plurality of user generated knowledge maps and with the plurality of knowledge maps created by the experts on the subject matter to create a gold standard map for a topic on the subject matter through the visual learning interface and data presentation module using an algorithm; and assessing an understanding of the user in a subject matter by comparing a user generated knowledge map with the knowledge map created by a teacher or an expert or an automatically generated gold standard map with the visual learning interface and data presentation module using an algorithm, and wherein the assessment module adopts at least two types of analysis methods for evaluating the maps created by the student, and wherein the two analysis methods are Template Based Analysis and Statistical/Heuristic Analysis, and wherein the teacher is enabled to create a map using one or more resources and the created map is used as a template in the template bused analysis method, and wherein the template is used by the teacher to create various assessment exercises that are designed to determine how well a student grasps the concepts and constructs the knowledge maps, and wherein the maps are constructed on the platform by the students while consuming the resource and the construction is analyzed automatically using direct comparison or statistical or semantic comparison, and wherein the comparison of the student map with the teacher's template is used as a feedback mechanism for the teacher;

wherein the step of collecting the plurality of resources or documents related to the particular topic from the user or content provider and extracting the relevant information comprises:

acquiring the plurality of resources or documents and placing the acquired documents in a document corpora, and wherein the document corpora is categorized by a subject, a topic and a unit;

performing a pre-processing operation on the collected resources or documents to determine a type or format of the collected resources or documents, and wherein the pre-processing operation includes a text processing operation, an audio processing operation and a video processing operation; and extracting a preset information related to the resource or document and wherein the preset information includes topic, file type, file size, author, owner, data created, and data modified; and wherein the step of parsing the resource or document to extract and tag all words in the resource or document using a parsing module comprises;

extracting and tagging all words in the resource or document except commonly used words and wherein the commonly used words includes articles, prepositions, conjugation and interjections;

tagging words with a position information, and wherein the position information includes a paragraph number, a line number, a column number and a row number for text, and wherein the position information includes an actual time offset in minutes or seconds for a video or audio;

tagging words with a formatting information, and wherein the formatting information includes a font size, a font type, a font style, a section header and a numbered list;

assigning a document formatting weights for each word in the document based on the formatting information using a plurality of typographical analysis methods;

calculating an intra-document semantic weight of the key-phrase or word in the document using a plurality of intra-document semantic analysis methods;

calculating an inter-document semantic weight of the key-phrase or word based on a corpus acquired by analyzing a document corpus;

combining the inter-document semantic weight and the intra-document semantic weight to create an aggregate semantic weight of the key-phrase or word in the document;

updating the aggregate semantic weight of the key-phrase or word based on the document formatting weights determined by the typographical analysis;

collecting and saving the updated aggregate semantic weight for the words in the acquired or collected documents in a database;

creating maps of a subject matter expert (SME) using a copy of the automatically generated knowledge map;

updating the gold standard map by verifying if the subject matter expert map meets one or more thresholds; and retaining and tracking the difference between maps, or delta, at each update between the original auto-generated map and the gold-standard map so that maps from previous iterations are recovered and used for comparison.

2. The method according to claim 1, wherein the step of classifying and tagging the words into the parts of speech using the Part-of-Speech (POS) tagging module comprises executing a plurality of training and analyzing algorithms to classify the words extracted by the parsing module with the parts of speech, and wherein the classification of the word is done based on a definition of the word and a context of the word in a phrase, a sentence, or a paragraph and wherein the words are tagged with Part of Speech (POS) tags and wherein the POS tags includes nouns, verbs and adverbs.

3. The method according to claim 1, wherein the step of creating the plurality of knowledge maps with the extracted words and the images using the visual learning interface and data presentation module comprises:

presenting the key-phrases, the words and the images extracted from the resource or document to the user in synchronization with a presentation of the resource;

dragging and dropping the extracted key-phrases on to the knowledge map with a user device to create a node on the knowledge map;

creating a plurality of nodes on the knowledge map by adding the image notes, normally adding the text nodes, the drawing nodes and the mathematical equation nodes onto the map:

editing a text on the node based on a user requirement or need, wherein only the text is modified while a tagged data associated with the node is retained;

connecting the plurality of nodes to each other using the linking phrases; and establishing a relation between the two nodes;

wherein a key-phrase node is selected to retrieve the source/original document from which the key-phrase is extracted and to retrieve the extracted key-phrase position m the source/original document, and wherein the nodes are converted from speech to text and played back during a review mode, and wherein an audio node is created instead of an image/text node and played back when the node is selected, and wherein a video node H0de is created so that an external video is played when the node is selected, and wherein the constructed knowledge map is edited using the editing tools to change the shapes, the colors and a link type, and wherein the constructed knowledge map is saved and retrieved at any time.

4. The method according to claim 1, further comprises analyzing a plurality of conceptual connections in the knowledge map, and wherein the step of analyzing the plurality of conceptual connections in the knowledge map comprises:
  acquiring a map data of the user knowledge map, and wherein the map data comprises a plurality of concepts and a plurality of links between the plurality of concepts;
  generating a knowledge map automatically from a corpus of resources and the existing maps for a topic;
  allowing a teacher to create a knowledge map, wherein the teacher created knowledge map is used for an assessment of the user knowledge map, and wherein the teacher created knowledge map is used as a base map by the user for personalizing the knowledge map;
  estimating a semantic closeness of knowledge map created by the user to the teacher knowledge map created by the teacher and/or the knowledge map generated from a corpus by using a plurality of template-based methods and statistical methods;
  extracting and storing a plurality of areas in the knowledge map created by the plurality of users to identify a portion that is difficult to comprehend or requires additional background information to help comprehend the material;
  forwarding the extracted information to the teacher for use in the follow-up classes or to redesign, re-purpose, or re-present a study material to the class;
  guiding the user through a process of creating a knowledge map until the user completely grasps and constructs an accurate knowledge map of the topic;
  wherein the plurality of conceptual connections made by the user are analyzed to evaluate a conceptual understanding of a topic with respect to an expected semantic meaning of a connection, and wherein the conceptual connections enable a teacher to evaluate a user's learning process while the user is in a process of taking of taking notes and before conducting a formal assessment.

5. The method according to claim 1, further comprises highlighting the key-phrases in the knowledge maps in conjugation with audio by the visual learning interface or data presentation module to anchor the concepts in a user memory to help recall and learning.

6. The method according to claim 1, further comprises generating an ontology/dataset for a specified category with an ontology/dataset processing module and mapping a data on a newly received resource to the already created ontology/dataset.

7. The method according to claim 1, further comprises providing a platform to create the interactive audio-visual knowledge maps for learning for children with special needs.

8. A system loaded with a plurality of software modules that are run on a hardware processor for creating, presenting, sharing and analyzing knowledge on a subject matter through a plurality of algorithms, the system comprising:
  a Resource Ingestion and Preprocessing module loaded on a computing device and nm on the hardware processor and configured to collect a plurality of resources or documents related to a particular topic from a plurality of online sources or documents, or content provider and extracting an information related to the particular topic from the plurality of resources or documents, through an algorithm and wherein a raw text, a plurality of words tagged with a position information and a plurality of images in a resource or document are extracted;
  a parsing module loaded on the computing device and nm on the hardware processor and configured to parse the resource or document to extent and tag all words in the resource or document through an algorithm and wherein the extracted words are tagged with a position information and a formatting information;
  a Part-of-Speech (POS) tagging module loaded on the computing device and run on the hardware processor and configured to classify and tag the words extracted by the parsing module into parts of speech based on a combination of a rule based algorithm and a stochastic based algorithm;
  a visual learning interface and data presentation module loaded on the computing device and running on the hardware processor and configured to create a plurality of knowledge maps with the extracted words and images, through an algorithm and wherein the plurality of knowledge maps are audio-visual knowledge maps, and wherein the plurality of knowledge maps comprises text, image(s), audio notes and video notes notes/nodes, and wherein the visual learning interface and data presentation module is further configured to receive a plurality of knowledge maps created by a plurality of experts on a subject matter, and wherein the visual learning interface and data presentation module is further configured to combine a plurality of knowledge maps created by a user with the plurality of knowledge maps created by the plurality of experts on the subject matter to create a gold standard map for a topic on the subject matter by using the visual learning interface and data presentation module; and
  a knowledge analysis module loaded on a computing device and run on the hardware processor and configured for assessing an understanding of the user in a subject matter by comparing a knowledge map created by the user with a knowledge map created by a teacher or an expert or a gold standard map by the visual learning interface and data presentation module;
  wherein the assessment module adopts at least two types of analysis methods for evaluating the maps created by the student, and wherein the two analysis methods are Template Based Analysis and Statistical/Heuristic Analysis, and wherein the teacher is enabled to create a map using one or more resources and the created map is used as a template in the template bused analysis method, and wherein the template is used by the teacher to create various assessment exercises that are designed to determine how well a student grasps the concepts and constructs the knowledge maps, and wherein the maps are constructed on the platform by the students while consuming the resource and the construction is analyzed automatically using direct comparison or statistical or semantic comparison, and wherein the comparison of the student map with the teacher's template is used as a feedback mechanism for the teacher;
  wherein the Resource Ingestion and Preprocessing module comprises a content ingestion and pre-processing module configured to acquire the plurality of resources or documents and placing the acquired documents in a document corpora, and wherein the document corpora is categorized by a subject, a topic and a unit, and wherein the content ingestion and pre-processing module is further configured to perform a pre-processing operation on the collected resources or documents to determined a type or format of the collected resources or documents, and wherein the pre-processing operation includes a text processing operation, and audio processing operation and a video processing operation, and wherein the content ingestion and pre-processing module is further configured to extract a preset information related to the resource or document, and wherein the preset information includes a topic, a file size, an author, an owner, a date created and a date modified; and wherein the parsing module is loaded on the computing device and run on the hardware processor and configured to extract and tag all words in the resource or document except commonly used words and stop words through an algorithm, and wherein the commonly used words includes articles, prepositions, conjunctions and interjections, and wherein the parsing module is further configured to tag the words with a position information, and wherein the position information includes a paragraph number, a line number, a column number and a row number for the text, and wherein the position information includes an actual play time in minutes or seconds for a video, and wherein the parsing module is further configured to tag the words with a formatting information, and wherein the formatting information includes a font size, a font type, a font style, a section header and a numbered list, and wherein the parsing module is farther configured to assign a document formatting weights for each word in the document based on the formatting information using a plurality of typographical analysis methods, and wherein the parsing module is further configured to calculate an intra-document semantic weight of a key-phrase or word in the document using a plurality of intra-document semantic analysis methods, and wherein the parsing module is further configured to calculate an inter-document semantic weight of the key-phrase or word based on a corpus acquired by analyzing a document corpus, and wherein the parsing module is further configured to combine the inter-document semantic weight and the intra-document semantic weight to create an aggregate semantic weight of the key-phrase or word in the document, and wherein the parsing module is further configured to update the aggregate semantic weight of the key-phrase or word based on the document formatting weights determined by the typographical analysis, and wherein the parsing module is further configured to collect and save the updated aggregate semantic weights for the words in the acquired or collected documents in a database wherein the gold standard map is updated by verifying if the expert map meets one or more thresholds and the difference between maps, or delta, at each update between the original auto-generated map and the gold-standard map is retained and tracked, so that maps from previous iterations are recovered and used for comparison.

9. The system according to claim 8, wherein the Part-of-Speech (POS) tagging module is configured to execute a plurality of training and analyzing algorithms to classify the words extracted by the parsing module with the parts of speech, through an algorithm, and wherein the classification of the words is done based on a definition of the word and a context of the word in a phrase, a sentence, or a paragraph and wherein the words are tagged with Part of Speech (POS) tags and wherein the POS tags includes the nouns, the verbs and the adverbs.

10. The system according to claim 8, wherein the visual learning interface and data presentation module is configured to present key-phrase, the words and the images extracted from a resource or document to the user in synchronization with a presentation of the resource, and wherein the visual learning interface and data presentation module is configured to allow the users to drag and drop the extracted keywords on to the knowledge map on a user device to create a plurality of nodes on the knowledge map, wherein the visual learning interface and data presentation module is configured to create a plurality of nodes on the knowledge map by dragging the key-phrases onto the map, wherein the visual learning interface and data presentation module is configured to edit a text on the node based on a user requirement or need, and wherein only the text is modified while a tagged data associated with the node is retained, and wherein the visual learning interface and data presentation module is configured to connect the plurality of nodes to each other using linking phrases, wherein the visual learning interface and data presentation module is configured to add a semantic information to each of the nodes, and wherein the visual learning interface and data presentation module is configured to establish a relation between the two nodes, and wherein the nodes are converted from a speech to a text and played back during a review mode, and wherein an audio node is created instead of an image node, or a text node and played back when the node is selected, and wherein a video node is created so that an external video is played when the node is selected, and wherein a video node is created so that an external video is played when the node is selected, and wherein the video node is created so that an external video is played when the node is selected, and wherein the images nodes, the drawing nodes and the equation nodes are created on the knowledge map, and wherein the constructed knowledge map is edited using the editing tools to change shapes, colors and link types, and wherein the contacted knowledge map is saved and retrieved at any time.

11. The system according to claim 8, further comprises a map analysis module loaded on a computing device and configured to analyze a plurality of conceptual connections in the knowledge map, through an algorithm, and wherein the map analysis module is configured to acquire a map data of the user knowledge map, and wherein the map data comprises a plurality of concepts and a plurality of links between the plurality of concepts, and wherein the map analysis module is configured to generate a knowledge map automatically from a corpus of the existing maps for a topic, and wherein the map analysis module is configured to allow a teacher to create a knowledge map for comparison with the user created knowledge maps, and wherein the map analysis module is configured to estimate a semantic closeness of knowledge map created by the user to the teacher knowledge map created map created by the teacher and/or knowledge map generated from a corpus by using a plurality of template-based methods and statistical methods, and wherein the map analysis module is configured to extract and store a plurality of areas in the knowledge map created by the users to identify a portion that is difficult to comprehend or requires additional background information, and wherein the map analysis module is configured to forward the extracted information to the teacher for use in the follow-up classes or to redesign, re-purpose, or re-present a study material to the class, and wherein the map analysis module is configured to guide a user through a process of creating a knowledge map until the user completely grasps and constructs an accurate knowledge map of the topic, wherein the plurality of conceptual connections made by the user are analyzed to evaluate a conceptual understanding of a topic with respect to an expected semantic meaning of a connection to enable a teacher evaluate a user learning process even before conducting a test.

12. The system, according to claim 8, further comprises a platform for learning for children with special needs.

13. The system according to claim 8, wherein further comprises a platform for searching knowledge in the form of interactive audio-visual knowledge maps.

14. The system according to claim 8, wherein the visual learning interface and data presentation module is configured to highlight the key-phrases in the knowledge maps in conjugation with audio to anchor concepts in a user memory to help recall and learning.

15. The system, according to claim 8, further comprises an ontology dataset processing module configured to generate an ontology/dataset for a specified category and to map a data on a newly received resource to the already created ontology/dataset.

\* \* \* \* \*